(12) United States Patent
Sarchi et al.

(10) Patent No.: US 6,577,800 B2
(45) Date of Patent: Jun. 10, 2003

(54) OPTICAL FIBER FOR METROPOLITAN AND ACCESS NETWORK SYSTEMS

(75) Inventors: Davide Sarchi, Milan (IT); Giacomo Stefano Roba, Monza (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 55 days.

(21) Appl. No.: 09/881,109

(22) Filed: Jun. 15, 2001

(65) Prior Publication Data

US 2002/0102082 A1 Aug. 1, 2002

Related U.S. Application Data

(63) Continuation of application No. PCT/EP99/09963, filed on Dec. 15, 1999.
(60) Provisional application No. 60/120,761, filed on Feb. 19, 1999.

(30) Foreign Application Priority Data

Dec. 18, 1998 (EP) ............................................. 98124064

(51) Int. Cl.[7] ................................................. G02B 6/16
(52) U.S. Cl. ........................................ 385/123; 385/127
(58) Field of Search ................................. 385/123, 124, 385/126, 127

(56) References Cited

U.S. PATENT DOCUMENTS

| | | | |
|---|---|---|---|
| 4,402,570 A | 9/1983 | Chang | |
| 4,406,518 A | 9/1983 | Matsumura et al. | |
| 4,412,722 A | 11/1983 | Carnevale et al. | |
| 4,715,679 A | 12/1987 | Bhagavatula | |
| 4,744,631 A | 5/1988 | Eichenbaum et al. | |
| 4,852,968 A | 8/1989 | Reed | |
| 5,613,027 A | 3/1997 | Bhagavatula | 385/123 |
| 5,905,838 A | 5/1999 | Judy et al. | 385/123 |
| 6,266,467 B1 * | 7/2001 | Kato et al. | 385/123 |
| 6,396,987 B1 * | 5/2002 | de Montmorillon et al. | 385/123 |
| 6,421,491 B1 * | 7/2002 | Liu | 385/127 |

FOREIGN PATENT DOCUMENTS

| | | |
|---|---|---|
| EP | 0 664 464 A1 | 7/1995 |
| EP | 0 668 675 A2 | 8/1995 |
| EP | 0 779 524 A3 | 6/1997 |
| EP | 0 859 247 A2 | 8/1998 |
| EP | 0 862 069 A2 | 9/1998 |
| EP | 0 984 305 A1 | 3/2000 |
| WO | WO97/33188 | 9/1997 |
| WO | WO00/17681 | 3/2000 |
| WO | WO00/31573 | 6/2000 |

OTHER PUBLICATIONS

Y. Liu et al., "Design and Fabrication of Locally Dispersion–Flattened Large Effective Area Fibers", ECO C, pp. 37–38, Sep. 24, 1998.

P. Nouchi et al., "Maximum Effective Area for Non–Zero Dispersion–Shifted Fiber", OFC '98, Technical Digest, pp. 303–304, 1998. (month unknown).

*Primary Examiner*—Rodney Bovernick
*Assistant Examiner*—Michael J. Stahl
(74) *Attorney, Agent, or Firm*—Finnegan, Henderson, Farabow, Garrett & Dunner, L.L.P.

(57) ABSTRACT

An optical transmission fiber for use in a metropolitan or access network is disclosed. The transmission line includes a fiber being single mode at a first operating wavelength of around 1310 nm and a second operating wavelength of around 1550 nm. The dispersion of the fiber is negative at one of the first and second wavelengths and positive at the other wavelength, with an absolute value of between about 5 and 15 ps/nm/km. The fiber also has a zero dispersion wavelength that is located between the first and second operating wavelengths, and an effective area at a wavelength around 1550 nm greater than about 60 $\mu m^2$. The cabled fiber has a cutoff wavelength less than about 1300 nm. The fiber allows wavelength division multiplexing (WDM) operation in both the bands (1310 nm and 1550 nm) by reducing nonlinear effects such as four-wave mixing (FWM).

52 Claims, 11 Drawing Sheets

OTHER PUBLICATIONS

G. Grasso et al., "Microbending Losses of Cabled Single Mode Fibres", ECO C, pp. 526–532, 1988. (month unknown).

G. Grasso et al., "Microbending Effects in Single Mode Optical Cables", International Wire and Cable Symposium Proceedings, pp. 722–731, 1988. (month unknown).

G. Agrawal, "Fiber–Optic Commuication Systems", secs. 5.2. to 5.3, pp. 199–208, 1997. (month unknown)

B. Ainslie et al., "A Review of Single–Mode Fibers With Modified Disperson Characteristics", Journal of Lightwave Technology, vol. LT–4, No. 8, pp. 967–979, 1986. (Aug.)

Y. Kodoma et al., "Nonlinear Pulse Propagation in a Monomode Dielectric Guide", IEEE Journal of Quantum Electronics, vol. QE–23, No. 5, pp. 510–524, May 1987.

P. Bachman, "Dispersion Flattened and Dispersion Shifted Single Mode Fibres: Worldwide Status", EEOC, pp. 17–25, 1986. (month unkown).

Bell Labs, "Technical Information on the Advantages of TrueWave® RS Fiber", Press Release in Jun. 1998.

Jeunhomme, L., "Basic Theory", Single Mode Fiber Optics, Marcel Dekker, Inc., Section 1.3.2, pp. 32–39 (1990). (month unkown).

* cited by examiner

OPTICAL FIBER FOR METROPOLITAN AND ACCESS NETWORK SYSTEMS

This application is a Continuation of PCT International Application No. PCT/EP99/09963, filed Dec. 15, 1999 and published in English as WO 00/37977 Jun. 29, 2000, and claims the right to priority based on European Application No. 98124064.1, filed Dec. 18, 1998, and U.S. Provisional Application No. 60/120,761, filed Feb. 19, 1999.

BACKGROUND OF THE INVENTION

The present invention relates generally to an optical communication system for signal transmission. More particularly, the invention relates to an optical transmission fiber for use in a metropolitan or access network.

The optical transmission networks use optical communication lines composed of a series of spans of optical fibers to connect a transmitter to a receiver. The optical networks within the optical system can be classified on the basis of the distance covered by the network. The network covering the greatest distance is known as a transport network. The transport network is typically used to provide a point to point connection between cities and is usually composed of 80 km fiber spans. Often signal amplifiers are connected between the fiber spans to account for power losses in the transmission line.

The transport networks are generally connected to smaller networks called metropolitan networks. The metropolitan networks provide a backbone structure used to distribute the signals received from the transport network. The distance covered by a metropolitan network is typically equivalent to a single span of the transport network. However, this distance can in general be as high as 150 km to cover large metropolitan areas. The metropolitan networks are used to collect and distribute signals coming from and going to the city. The metropolitan networks are best viewed as the interface between long straight transport and the shorter distribution networks connected to the end receiver.

The shorter distribution networks are commonly referred to as distribution or access networks. For purposes of simplicity, the term access networks is intended to include the distribution and access networks, as well as any other network that accomplishes the same purpose. The access networks are the shortest of all networks and serve to connect the end receiver to the metropolitan network.

Because each category of network is designed to fulfill a different purpose, the transmission characteristics of the optical fiber used in each network is preferably different. For example, the primary purpose of a transport network is to carry a signal over a long distance. Thus, the optimal optical fiber for a transport network should have a low power loss, or low attenuation. Having a low attenuation will decrease the number of amplifiers required to send the signal over the transmission length and increase the overall efficiency of the network.

The primary purpose of the metropolitan and access networks is to distribute the signal received from the transport network. Since both networks focus on distributing the signal, the optimal fiber for both networks will have similar transmission characteristics. More particularly, the optimal fiber for both networks should be capable of handling a large number of signals at a high data transmission rate. The fiber should also allow the signals to be easily split. In addition, the fiber should have a low attenuation (as with the transport network fiber) to avoid the need for excessive amplifications and a quite large effective area to facilitate coupling (e.g., by splices and/or connectors).

The so called effective core area, or briefly, effective area, is given by $$A_{eff} = \frac{2\pi \left[\int_0^\infty |F(r)|^2 r \, dr\right]^2}{\int_0^\infty |F(r)|^4 r \, dr}. \quad (1)$$

where r is the radial coordinate of the fiber and F(r) is the fundamental mode radial distribution.

Other characteristics desired in a metropolitan network fiber include the ability to handle a large amount of optical power and the presence of a low dispersion slope. The frequency of splitting of the optical signals traveling in the metropolitan network fiber requires that signals with a large amount of power are coupled into the beginning of the fiber. Consequently, the metropolitan fiber should have a low attenuation and should have a quite low nonlinearity coefficient r to cope with nonlinear effects induced by the high power signal. A low dispersion slope helps to equalize the dispersion among WDM channels.

The strength of non-linear effects acting on pulse propagation in optical fibers is linked to the product of the non-linearity coefficient γ and the power P. The definition of the non-linearity coefficient, as given in the paper "Nonlinear pulse propagation in a monomode dielectric guide" by Y. Kodama et at., IEEE Journal of Quantum Electronics, vol. QE-23, No. 5, 1987, is the following:

$$\gamma = \frac{1}{\lambda n_{eff}} \frac{\int_0^\infty n(r) n_2(r) |F(r)|^4 r \, dr}{[\int_0^\infty |F(r)|^2 r \, dr]^2}. \quad (2)$$

where $n_{eff}$ is the effective mode refractive index, λ is a signal wavelength, n(r) is the refractive index radial distribution, and $n_2(r)$ is the non-linear index coefficient radial distribution.

Applicants have identified that equation (2) takes into account the radial dependence of the non-linear index coefficient $n_2$ which is due to the varying concentration of the fiber dopants used to raise (or to lower) the refractive index with respect to that of pure silica.

If we neglect the radial dependence of the non-linear index coefficient $n_2$ we obtain a commonly used expression for the coefficient γ.

$$\gamma = \frac{2\pi n_2}{\lambda A_{eff}} \quad (3)$$

The approximation (3), in contrast to the definition (2) does not distinguish between refractive index radial profiles that have the same effective core area $A_{eff}$ value but different γ values. While $1/A_{eff}$ is often used as a measure of the strength of non-linear effects in a transmission fiber, γ as defined by equation (2) actually provides a better measure of the strength of those effects.

Furthermore, the fiber used in the metropolitan and access networks must be compatible with the fiber used in the transport networks and with currently installed systems. The majority of currently installed systems have operating wavelengths within a band of wavelengths surrounding either 1310 nm or 1550 nm. Generally, long distance transmissions require low fiber attenuation, which can be obtained at larger wavelengths. To take advantage of the low attenuation, the current trend in optical amplifiers is to allow the amplification of larger wavelengths. New generation amplifiers are expanding the amplification wavelength band surrounding 1550 nm to extend up to and include 1625 nm as a possible operating wavelength. The access networks typically operate in the wavelength band around 1310 nm and a number of components have been developed to also operate at this wavelength. In addition, CATV systems generally operate around 1550 nm but may include a service channel operating at around 1310 nm. Moreover, optical amplification in the wavelength band around 1310 nm is being developed.

To account for these considerations, the optimal metropolitan or access fiber should be capable of operating within the wavelength bands surrounding both the 1310 nm and 1550 nm wavelengths and supporting both positive and negative dispersion systems. By operating successfully in these wavelength bands, the metropolitan network fiber will support currently available components installed for 1310 nm systems and also adapt to future generations of components operating at wavelengths up to 1625 nm.

To meet the high capacity requirement, metropolitan and access networks will likely take advantage of Wavelength Division Multiplexing (WDM) technology to increase the number of transmission channels. WDM technology is limited by the phenomenon of Four Wave Mixing (FWM) which results in the mixing of signals traveling in different transmission channels. This phenomenon can be minimized or avoided by using single mode fibers that have an absolute dispersion value that is greater than zero around the operating wavelengths. However, if the dispersion value of the fiber is too large, the signals will become distorted during transmission unless dispersion compensation devices are included in the transmission line.

There are many existing types of optical fiber that are currently used in WDM systems, each of which, for the reasons explained below, are incapable of meeting the requirements of a metropolitan or access network. Single mode, step index (SM) fiber, for example, has a zero dispersion at an operating wavelength of 1310 nm and a high positive dispersion (17 ps/nm/km) at an operating wavelength of 1550 nm. This type of fiber is unsuitable for use in metropolitan or access networks because simulations show that 10 Gbit/s transmission cannot be achieved at 1550 nm without dispersion compensation for a 50 km SM fiber. In addition, SM fiber is not compatible with systems that require a negative dispersion above 1310 nm. In addition, SM fiber does not support WDM transmission at around 1310 nm because of low dispersion.

Dispersion Shifted (DS) fibers have a zero dispersion at the 1550 nm operating wavelength and a highly negative dispersion at the 1310 nm wavelength. Thus, DS fibers are susceptible to FWM problems around the 1550 nm wavelength and would require dispersion correction at the 1310 nm wavelength. In addition, DS fibers are incompatible with systems requiring a positive dispersion below 1550 nm. Thus, DS fibers are not well suited for metropolitan or access networks.

Large Effective Area (LEA) fibers can also be used in WDM systems. However, these fibers often have a cut-off wavelength above 1310 nm and are, therefore, not monomodal at the 1310 nm wavelength. This condition reduced the use of LEA fibers to only around 1550 nm systems. Therefore, LEA fibers are also unsuited for use in metropolitan or access networks.

Non-Zero Dispersion (NZD) fibers are also typically used in WDM systems. However, these fibers have a high absolute value of the dispersion around 1310 nm. Thus, the NZD fibers require dispersion compensation around 1310 nm to maintain an acceptable transmission bit rate.

Applicants have observed that NZD fibers, as well as DS fibers, typically have peak refractive index difference values in the core center of greater than 0.0100, for example of 0.0120.

Furthermore, Reduced Dispersion Slope Non-Zero Dispersion (RDS-NZD) fibers have been designed to meet the needs of long distance WDM or DWDM systems. They have a low dispersion and a low dispersion slope in a wavelength band around 1550 nm, and a relatively small absolute value dispersion around 1310 nm. For example, Lucent Technologies provided a press release in June 1998 introducing its TrueWave® RS Fiber that has a reduced slope of dispersion. According to the release, the new fiber has a dispersion slope across a wavelength band of about 1530–1620 nm with a low value, such that the dispersion ranges from about 3.5–7.5 ps/nm/km. The TrueWave® RS Fiber is now marketed by Lucent Technologies.

Applicants have determined that the effective area of a TrueWave® RS Fiber at a wavelength of about 1550 nm is of about 55 $\mu m^2$. In general, Applicants have determined that a reduced dispersion slope is achieved in RDS-NZD fibers at the expense of a rather small effective area. Accordingly, RDS-NZD fibers are less than optimal as to their coupling and splitting characteristics.

Various publications disclose optical fibers having a variety of different transmission characteristics. For example, Peter Klaus Bachmann, "Dispersion Flattened and Dispersion Shifted Single Mode Fibres; Worldwide Status", ECOC, 1986, pp. 17–25, describes a variety of single mode fibers, including dispersion shifted and dispersions flattened fibers having differing refractive index profiles. Similarly, B. James Ainslie and Clive R. Day, "A Review of Single-Mode Fibers with Modified Dispersion Characteristics", Journal of Lightwave Technology, Vol. LT4, No. 8, Aug. 1986, describe dispersion shifted fibers that have different refractive index profiles to produce a zero dispersion wavelength at either 1300 nm or 1510 nm. Also disclosed are techniques for achieving a relatively flat dispersion spectra over a wide range of wavelengths.

U.S. Pat. No. 4,402,570 to Chang, discusses a method of fabricating optical fibers that have minimized attenuation and dispersion at operating wavelengths of 1.3 $\mu m$ and 1.55 $\mu m$. The minimized attenuation and dispersion results from a cancellation between the material and wavelength dispersions which is owed to the proper selection of parameters.

U.S. Pat. No. 4,412,722 to Carnevale et al. discusses an optical fiber which supports a single mode transmission at a wavelength usually between 0.6 $\mu m$ and 1.7 $\mu m$. The index of refraction of the core material is graded in the radial direction so as to yield an optical fiber with very low total dispersion and therefore high bandwidth.

U.S. Pat. No. 4,715,679 to Bhagavatula discusses an optical fiber having a core surrounded by a layer of cladding material. The core is characterized in that it includes a region of depressed refractive index. By appropriately selecting the core index depression characteristics, a fiber having desired waveguide dispersion characteristics can be designed. Thus, dispersion minimization over a wide wavelength range can be achieved without adverse effect on system loss.

U.S. Pat. No. 4,744,631 to Eichenbaum et al. discusses a single mode optical fiber ribbon cable. The cable includes a filling compound and/or fibers having a coating that comprises a low modulus inner coating and a high modulus outer coating. Communication cable according to the '631 patent is capable of transmitting a signal with an attenuation of less than 0.1 dB/km.

U.S. Pat. No. 4,852,968 to Reed discusses a single mode optical fiber. The refractive index profile of the fiber has a depressed-index or trench region in the core region. The principle advantage of this fiber structure is the ease of adjusting fiber characteristics by adjustment of the trench size or placement. According to Reed a further advantage of his invention is the ability to attain improved power confinement.

U.S. Pat. No. 5,613,027 to Bhagavatula discusses a single mode optical waveguide fiber designed for high data rate transmissions. A distinguishing feature of the waveguide core is that the minimum refractive index of the central core region is less than the minimum index of the adjacent annular region. This feature allows a preselected zero dispersion wavelength and dispersion magnitude over a target wavelength range. The '027 patent discusses altering the zero dispersion wavelength to match the operating wavelength to reduce the total dispersion of the transmission.

EP patent application 862,069 (Nippon Telegraph and Telephone) discloses, among others, an optical fiber capable of suppressing optical nonlinear effects. The FWM is suppressed by varying chromatic dispersion of the optical fiber along the longitudinal direction. FIG. 14 of this application shows a change in zero dispersion wavelength when each relative index difference is changed while maintaining a given index relationship between a core and a first, a second and a third cladding. By changing the combination of relative index differences, zero dispersion in the wavelength band of 1.3 to 1.6 $\mu$m or in a longer wavelength band can be realized.

Applicants have determined that a figure of merit (FOM) in an optical fiber for a metropolitan or access network is the product of the number of WDM channels times the channel bit rate times the maximum fiber length over which said bit rate can be maintained for each channel. Specifically, applicants have discovered that conventional fiber cannot support high FOM transmissions in the wavelength band around 1310 nm.

Applicants have determined that another relevant characteristic in an optical fiber for a metropolitan or access network is ease of splicing and connection.

Applicants have found that the conventional fibers and the fibers disclosed in the described publications are incapable of meeting the needs of a metropolitan or access network, in particular in that they do not provide a high value of the above defined FOM in combination with desirable splicing and coupling capabilities.

SUMMARY OF THE INVENTION

Accordingly, the present invention is directed to an apparatus for a metropolitan or access network that substantially obviates one or more of the limitations and disadvantages of the described prior arrangements. The objects and advantages of the invention will be realized and attained by means of the elements and combinations particularly pointed out in the appended claims. Additional objects and advantages of the invention will be set forth in part in the description which follows, and in part will be obvious from the description, or may be learned by practice of the invention.

In an aspect, the invention is a high-speed metropolitan or access optical communication system. The system includes an optical signal transmitter operating in a wavelength band surrounding at least one of a first operating wavelength at about 1310 nm and a second operating wavelength at about 1550 nm. The system also includes an optical transmission line coupled at one end to the optical signal transmitter and a receiver coupled to an opposite end of the optical transmission line. The transmission line comprises at least one cabled single-mode optical fiber that has a maximum refractive index difference located in a core layer of the fiber. The cabled fiber has a cutoff wavelength less than 1300 nm, a positive dispersion with a value between about 5 ps/nm/km and about 15 ps/nm/km at one of the first and second operating wavelengths, a negative dispersion with an absolute value between about 5 ps/nm/km and about 15 ps/nm/km at the other of the first and second operating wavelengths, a zero dispersion at a wavelength between the first and second operating wavelengths, and an effective area greater than about 60 $\mu$m$^2$ at a wavelength around 1550 nm.

The optical transmission line has advantageously a length equal to or less than about 150 km, preferably equal to or less than about 80 km.

Typically, the dispersion at the first operating wavelength is negative and the dispersion at the second operating wavelength is positive, and the dispersion increases monotonically from the first operating wavelength to the second operating wavelength.

According to a preferred embodiment, the wavelength band surrounding the first operating wavelength ranges from about 1300 nm to 1350 nm and the wavelength band surrounding the second operating wavelength ranges from about 1450 nm to 1625 nm.

Preferably, the fiber has an effective area of greater than about 65 $\mu$m$^2$ at a wavelength of about 1550 nm.

Preferably, the fiber has a non-linearity coefficient of less than 1.5 W$^{-1}$m$^{-1}$ in the second wavelength band.

Preferably, the fiber has a dispersion slope of less than about 0.08 ps/nm$^2$/km in the second wavelength band.

Preferably, the fiber has a microbending sensitivity of less than about 10 (dB/km)/(g/mm) in the second wavelength band.

Preferably, the cabled fiber has a transmission cut-off wavelength that is less than about 1250 nm.

In an embodiment, the communication system further comprises at least one optical amplifier coupled along the optical transmission line.

Preferably, the fiber has a macrobending attenuation coefficient of less than or equal to 50 dB/km for 100 turns of fiber loosely wound with about a 30 mm radius, measured at 1550 nm. More preferably, the macrobending attenuation coefficient, measured in the above conditions, is less than or equal to 25 dB/km. Even more preferably, the macrobending attenuation coefficient, measured in the above conditions, is less than or equal to 1 dB/km.

In another aspect, an optical fiber consistent with the present invention involves a single-mode optical transmission fiber for use in a metropolitan or access network. The fiber includes a core and a cladding surrounding the core. The core comprises an inner core having a first refractive index difference and a first glass layer surrounding the inner core and having a maximum second refractive index difference that is greater than the first refractive index difference and lower than about 0.0140. The cabled fiber has a cutoff wavelength less than about 1300 nm, an absolute value of dispersion between about 5 ps/nm/km and 15 ps/nm/km at both a first wavelength of about 1310 nm and a second wavelength of about 1550 nm, a zero value of dispersion at a wavelength between about 1350 nm and 1450 nm, and an effective area at a wavelength around 1550 nm greater than about 60 $\mu$m$^2$. Preferably, the fiber has an effective area at a wavelength around 1550 nm greater than about 65 $\mu$m$^2$.

In an embodiment, the inner core has a refractive index difference of substantially zero and a radius R of between about 0.5 $\mu$m and 2.5 $\mu$m. The first glass layer may have a maximum refractive index difference of between about 0.0090 and 0.0140, a profile α of between 1 and δR and a width 8R of between about 0.5 μm and 2.0 μm.

In an alternative embodiment the fiber further comprises a second glass layer radially comprised between the inner core and the first glass layer, the second glass layer having a refractive index difference of substantially zero and an outer radius R of between about 1.0 μm and 2.0 μm. The inner core may have a maximum refractive index difference of between about 0.0020 and 0.0060 a profile having a between 1 and 4 and a radius a of between about 0.5 μm and 2.0 μm. The first glass layer may have a maximum refractive index difference of between about 0.0090 and 0.0140 and a width δR of between about 1.0 μm and 2.0 μm.

In another alternative embodiment the fiber further comprises a second glass layer surrounding the inner core and having a depressed refractive index. The inner core may have a maximum refractive index difference of between about 0.0060 and 0.0120, a profile a of between 1 and 10 and a radius $w_1$ of between about 2.5 μm and 5.5 μm. The second glass layer may have a width $w_2$ of between about 0.5 μm and 5.5 μm and a minimum refractive index difference of between about −0.0050 and −0.0002. The first glass layer may have a maximum refractive index difference of between about 0.0060 and 0.0120 and a width $w_3$ of between about 0.4 μm and 3.0 μm.

In yet another aspect, the present invention is directed to a single-mode optical transmission fiber for use in a metropolitan or access network. The fiber includes a core and a cladding surrounding the core. The core comprises an inner core having a first refractive index difference; and a first glass layer surrounding the inner core. The refractive index difference of the inner core is greater than the refractive index difference of the first glass layer and the refractive index difference of the first glass layer is greater than zero. The inner core has a maximum refractive index difference of between about 0.0060 and 0.0090. The cabled fiber has a cutoff wavelength less than about 1300 nm, an absolute value of dispersion between about 5 ps/nm/km and 15 ps/nm/km at both a first wavelength of about 1310 nm and a second wavelength of about 1550 nm, a zero value of dispersion at a wavelength between about 1350 nm and 1450 nm and an effective area at a wavelength around 1550 nm greater than about 60 $\mu m^2$.

In an embodiment, the inner core extends to an outer radius of between about 2.0 and 4.0 μm, and the first glass layer extends from the outer radius of the inner core to an outer radius of between about 3.0 and 5.0 μm and has a maximum refractive index difference of between about 0.0020 and 0.0050.

In another embodiment, a second glass layer is disposed between the inner core and the first glass layer, the second glass layer having a refractive index difference of substantially zero. Preferably, the inner core extends to an outer radius of between about 2.0 and 4.5 μm and has a maximum refractive index of between about 0.0070 and 0.0090, the second glass layer extends from the outer radius of the inner core to an outer radius of between about 3.0 and 5.0 μm, and the first glass layer radially extends from the outer radius of the second glass layer for about 2.0 to 4.0 μm and has a maximum refractive index difference of between about 0.0010 and 0.0030.

In a further embodiment, a second glass layer having a depressed refractive index difference is disposed between the inner core and the first glass layer. Preferably the inner core extends to an outer radius of between about 2.5 and 5.5 μm, the second glass layer extends from the outer radius of the inner core for a width of between about 0.5 and 5.5 μm and has a minimum refractive index difference of between about −0.0050 and −0.0002, and the first glass layer radially extends from the outer radius of the second glass layer for about 0.5 to 5.5 μm and has a maximum refractive index difference of between about 0.0010 and 0.0080.

In a still further aspect, the present invention is directed to a wavelength division multiplexing optical transmission method, comprising the step of transmitting optical signals over a range of transmission channels within a first wavelength band between about 1300 nm and 1350 nm and a second wavelength band between 1450 nm and 1625 nm. The inventive method also comprises the step of coupling the optical signals to at least one single-mode optical fiber having an inner core and at least a first glass layer, wherein the cabled fiber has a cutoff wavelength less than 1300 nm, a positive dispersion with an absolute value of less than about 15 ps/nm/km at a wavelength of about 1550 nm, a negative dispersion with an absolute value less than about 15 ps/nm/km at a wavelength of about 1310 nm, a zero dispersion at a wavelength between about 1350 nm and 1450 nm and an effective area at a wavelength around 1550 nm greater than about 60 $\mu m^2$. The method further comprises receiving the signals from the single-mode optical fiber.

Throughout the present description reference is made to refractive index profiles of optical fibers. The refractive index profiles comprise various radially arranged sections. Reference is made in the present description to precise geometrical shapes for these sections, such as step, alpha-profile, parabola. As is well known to one of ordinary skill in the art, fiber manufacturing process may introduce changes in the shape of the structural sections of the described, idealized, refractive index profiles, such as a central dip in the proximity of the fiber axis and diffusion tails associated with the refractive index peaks. It has been shown in the literature, however, that these differences do not change the fiber characteristics if they are kept under control.

In general, a refractive index profile section has an associated effective refractive index profile section which is different in shape. An effective refractive index profile section may be substituted, for its associated refractive index profile section without altering the overall waveguide performance. For example, see "Single Mode Fiber Optics", Luc B. Jeunhomme, Marcel Dekker Inc., 1990, page 32, section 1.3.2 or U.S. Pat. No. 4,406,518 (Hitachi). It will be understood that disclosing and claiming a particular refractive index profile shape, includes the associated equivalents, in the disclosure and claims.

Moreover, it is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated and constitute a part of this specification, illustrate several embodiments of the invention, and together with the description, serve to explain the principles of the invention.

FIG. 4b is a cross sectional view of a fiber having the refractive index profile of FIG. 4a;

FIG. 5b is a cross sectional view of a fiber having the refractive index profile of FIG. 5a;

FIG. 6b is a cross sectional view of a fiber having the refractive index profile of FIG. 6a;

FIG. 7b is a cross sectional view of a fiber having the refractive index profile of FIG. 7a;

FIG. 8b is a cross sectional view of a fiber having the refractive index profile of FIG. 8a;

FIG. 9b is a cross sectional view of a fiber having the refractive index profile of FIG. 9a;

FIG. 10b is a cross sectional view of a fiber having the refractive index profile of FIG. 10a;

FIG. 11b is a cross sectional view of a fiber having the refractive index profile of FIG. 11a.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with the present invention, an optical transmission fiber for use in a metropolitan or access network is provided. The network includes an optical signal transmitter that operates in a wavelength band surrounding at least one of a first operating wavelength at 1310 nm and a second operating wavelength at about 1550 nm. It should be noted that the wavelength band surrounding the operating wavelength at 1310 is conventionally known as the second transmission window and that the wavelength band surrounding the operating wavelength at 1550 nm is conventionally known as the third transmission window. For the purposes of this disclosure, however, the second and third transmission windows (possibly extended up to a wavelength of 1625 nm) will be referred to as the first and second wavelength bands.

At least one single-mode optical fiber, having a maximum refractive index difference located in a radial core zone, is coupled to the optical signal transmitter. The cabled fiber has a cutoff wavelength of less than 1300 nm, a positive dispersion less than about +15 ps/nm/km at one of the first and second operating wavelengths, a negative dispersion with an absolute value less than about 15 ps/nm/km at the other of the first and second operating wavelengths, and a zero dispersion at a wavelength between the first and second operating wavelengths. The network also includes a receiver coupled to the single-mode optical fiber.

A metropolitan network is defined as the series of spans of optical fiber that comprise the interface between the longer transport networks and the shorter, capillary-like access networks. The metropolitan networks typically direct the signals received from the transport networks into ring-type links that could, for example, encircle a city. The access networks are the series of spans of optical fiber that direct the signals from the metropolitan networks to the end receivers. It is contemplated that the present invention can be used in a metropolitan or access network or any other network that requires a fiber having similar transmission characteristics.

Figure 1:
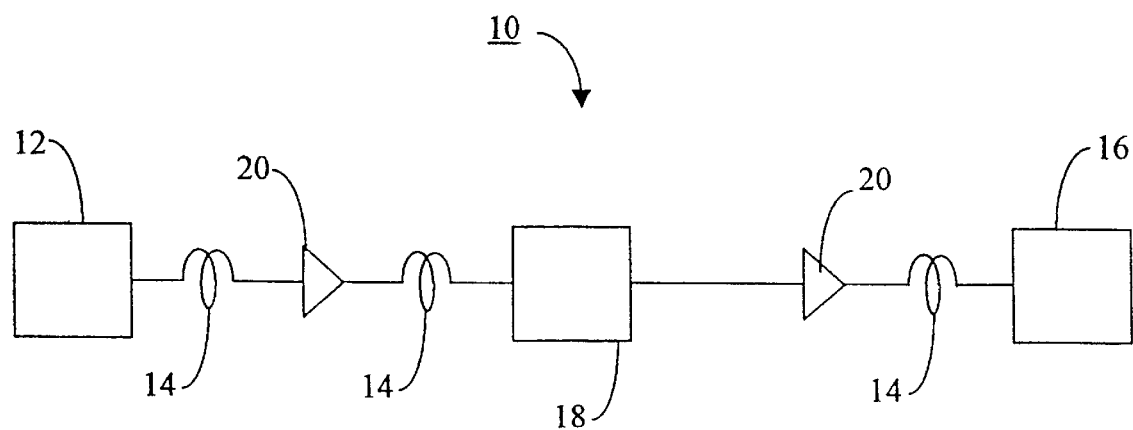
FIG. 1 is a block diagram of an optical communications system for use with the present invention.

FIG. 1 illustrates a high-speed optical communication system for the present invention. Communication system 10 includes a signaling or transmitter device 12, an optical fiber transmission line 14, optical amplifiers 20, a receiver 16, and an interfacing module 18. Transmitter 12 adds a signal to transmission line 14. The present invention contemplates the use of any device or combination of devices readily apparent to one skilled in the art to add the signal to the transmission line. The transmitter 12 could include, for example, a DFB laser modulated directly or externally, e.g. with a Mach-Zehnder interferometer, or a combination of such devices in a WDM configuration. As well, transmitter 12 could comprise wavelength converters for receiving signal wavelengths from a separate transmission network and converting the carrier wavelengths to characteristic wavelengths for metropolitan or access network 10 in a conventional manner. In a preferred embodiment, the signal or signals generated by transmitter 12 has a center wavelength in a wavelength band between about 1300 nm and 1350 nm or between about 1450 nm and 1625 nm. Naturally, if system 10 operates as a WDM system, transmitter 12 can generate a range of channels that, for example, can spread across the above wavelength bands or portions thereof. Although optical amplifiers 20 can be advantageously included in a high speed optical communication system according to the invention, the invention deals also with a non-amplified optical communication system, or with a system including amplification of only one or more than one sub-band of the above wavelength bands. For example, the system may include optical amplifiers for the 1530–1565 nm wavelength range and allow nevertheless shorter distance WDM transmission on a part of or throughout the remaining available wavelength bands.

In accordance with the present invention, the transmission line 14 includes at least one optical fiber. However, the present invention also contemplates the use of multiple fibers in the same transmission line to increase the signal carrying capacity of the line. The fiber, or multiple fibers bound together, are usually protected in a cable.

Optical fiber 14 can operate effectively in single mode in both a first and second wavelength band. In a preferred embodiment, the first wavelength band is between about 1300 nm and 1350 nm and the second wavelength band is between about 1450 nm and 1625 nm. In order to operate as a single-mode fiber for both the first and second operating wavelengths, fiber 14 has a cable cutoff wavelength that is less than about 1300 nm. Preferably, the cable cutoff wavelength is less than about 1250 nm, and it can be around 1100 nm.

These operating wavelengths will make the fiber of the present invention compatible with existing transport networks and related technology that operates at the two wavelength bands around 1310 nm and 1550 nm. A significant amount of technology currently operates at 1310 nm, although the current trend in transport networks is to operate at larger wavelengths between 1450 nm and 1625 nm because of the low attenuation and because of the characteristic emission band of erbium-doped fiber amplifiers and new generation amplifiers. Thus, the fiber of the present invention is compatible with existing technology operating at 1310 nm and can also be used with technology operating at between 1450 nm and 1625 nm. In addition, the fiber is capable of supporting any type of communication including those communications having signals with different bit rates or protocols, such as NRZ (non return to zero) or, in alternative, RZ (return to zero), e.g., soliton-like.

In accordance with the present invention, the transmission line 14 also includes varying levels of chromatic dispersion across its operating range. Fiber 14 preferably has a monotonically increasing value of dispersion across its operating bandwidth from 1310 nm through 1625 nm. In contrast with known transport and metropolitan network fibers, however, fiber 14 includes a relatively moderate dispersion value in the first and the second transmission windows of opposite signs from one another, together with a zero-dispersion wavelength $\lambda_0$ located between the first and second transmission windows. Because the fiber of the present invention includes both positive and negative dispersion values, the fiber is compatible with systems that require either a positive dispersion or a negative dispersion. The fiber has non-zero dispersion characteristics in each band that allow WDM transmission, with or without optical amplification, in either band or in both bands. Thus, the fiber of the present invention will not need to be upgraded in order to match increased system throughput requirements. In addition, the transmission characteristics of the disclosed fiber are likely to be suitable for system requirements that are likely to be introduced in the near future.

Figure 2:
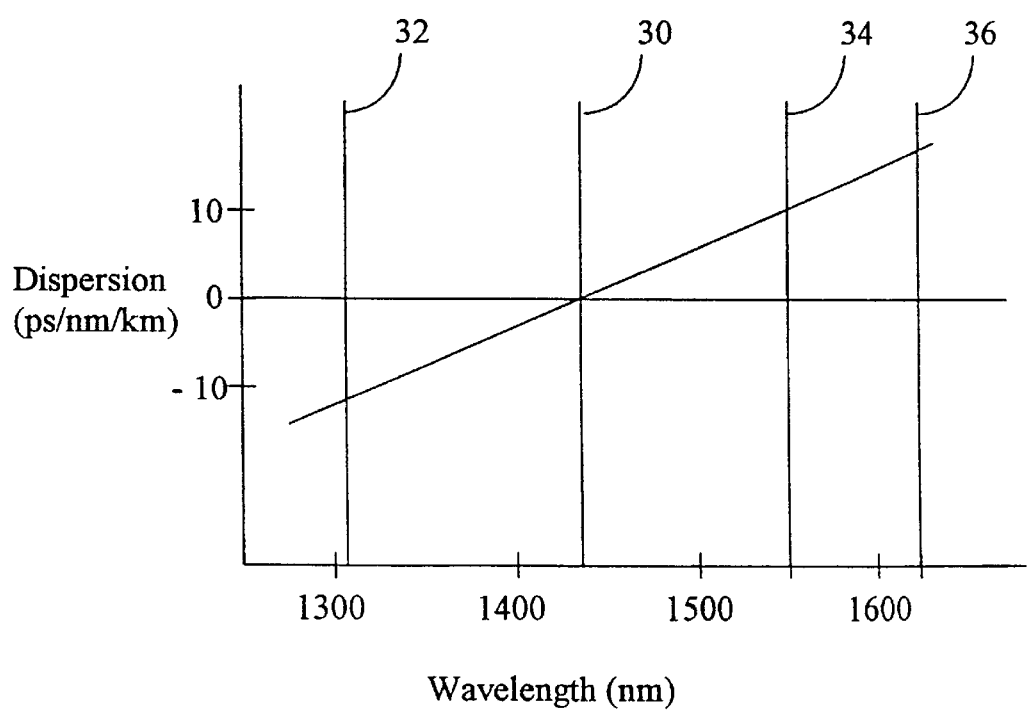
FIG. 2 is a graph illustrating schematically the relationship of the dispersion value to the operating wavelength for one embodiment of the fiber of the present invention.

As illustrated in FIG. 2, fiber 14 has a negative chromatic dispersion value within the first wavelength band about 1310 nm (referred to as reference number 32). Fiber 14 has a positive chromatic dispersion value within the second wavelength band around 1550 nm (referred to as reference number 34). Fiber 14 has a chromatic dispersion of zero at a wavelength 30 located between the first and second wavelength bands. Preferably, the zero-dispersion wavelength is between about 1350 nm and 1450 nm. More preferably, the zero-dispersion wavelength is about 1400 nm.

The absolute value of the dispersion in each of the first and second wavelength bands has a moderate value compared with existing transmission fiber. Preferably, the absolute value of the dispersion at the operating bands around 1310 nm and 1550 nm is between about 5 ps/nm/km and 15 ps/nm/km. More preferably, the value of dispersion at 1550 nm is between about 5 ps/nm/km and 12 ps/nm/km.

Figure 3:
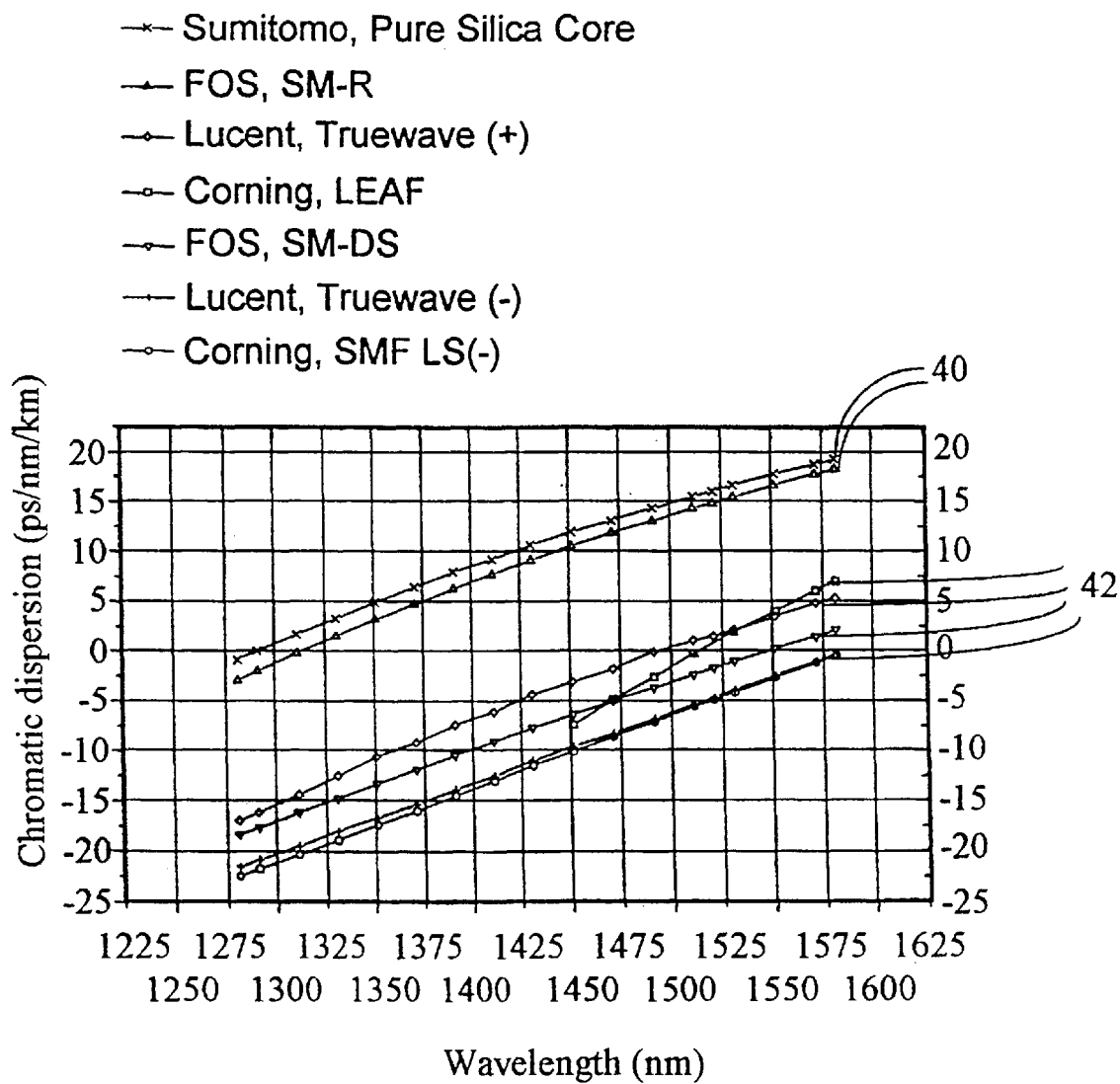
FIG. 3 is a graph illustrating the chromatic dispersion values for several conventional fibers, including Sumitomo, Pure Silica Core: FOS, SM-R; Lucent, TRUEWAVE(+); Corning, LEAF; FOS, SM-DS; Lucent, TRUEWAVE (−); and Corning SMF LS(−)

As is readily known in the art and is illustrated in FIG. 3, standard transmission fiber 40 with a zero dispersion value at about 1310 nm has a positive value of dispersion at around 1550 nm of about +17 ps/nm/km. This dispersion value necessitates the use of dispersion compensating equipment when a length of fiber longer than about 40 km is used at a bit rate of 10 Gbit/s with systems operating at 1550 nm. Fiber 14 of the present invention, however, has a moderate value of positive dispersion, the absolute value being greater than 5 ps/nm/km and less than 15 ps/nm/km at a wavelength of about 1550 nm. This characteristic provides desirable operation for dense WDM systems by avoiding or minimizing nonlinear effects such as those caused by four-wave mixing.

As is also known in the art, standard transmission fibers 42 that have a zero or low dispersion value at about 1550 nm have a negative dispersion at around 1310 nm of less than about −16 ps/nm/km. Fiber 14 of the present invention, however, has a moderate value of negative dispersion, the absolute value being less than 15 ps/nm/km in the wavelength band around 1310 nm.

As also shown in FIG. 2, the slope of the dispersion of fiber 14 is relatively low across the first and second wavelength bands. Preferably, the slope of the dispersion is less than about 0.08 ps/nm$^2$/km at a wavelength of about 1550 nm. This relatively low dispersion slope ensures good equalization between channels of WDM system 10 that otherwise may have drastically divergent dispersion values between them. In addition, the chromatic dispersion for fiber 14 preferably increases monotonically across both wavelength bands.

These transmission characteristics make fiber 14 well suited for use in a WDM system. Because the absolute value of dispersion is substantially greater than zero at the operating wavelengths, the fiber of the present invention will not encounter the problems associated with four-wave mixing. Furthermore, the dispersion slope is relatively low. Thus, the fiber of the present invention can be used with WDM technology to increase the number of channels available for transmitting signals and/or the channel bit rate and/or the maximum transmission length without dispersion compensation, i.e., to increase the fiber figure of merit (FOM).

In accordance with the present invention, the fiber of the present invention will have a quite large effective area, typically greater than 60 $\mu$m$^2$ at a wavelength around 1550 nm. The effective area of the fiber has a direct effect on other transmission characteristics of the fiber. A fiber with a smaller effective area will generally have a lower dispersion slope, macrobending sensitivity, and microbending sensitivity than a fiber with a large effective area. However, a fiber with a large effective area has a lower non-linearity coefficient and can facilitate multiple splices or connectors better than a fiber with a smaller effective area. Thus, the present invention contemplates that the fiber will have an effective area that is as large as possible to facilitate multiple splices or connectors without disturbing the optical parameters discussed above. In a preferred embodiment, the effective area of the fiber at a wavelength around 1550 nm is greater than about 65 $\mu$m$^2$.

Furthermore, the fiber of the present invention has a peak refractive index difference of less than or equal to about 0.0140. The relatively low dopant content values so attained help achieving a relatively low attenuation for the fiber.

In addition, fiber 14 has a non-linearity coefficient and a microbending sensitivity that are as low as possible given the other constraints on effective area. Preferably, in the second wavelength band, the non-linearity coefficient of the fiber is less than about 1.5 $W^{-1}m^{-1}$ and the microbending sensitivity is less than about 10 (dB/km)/(g/mm), as determined at a wavelength of 1550 nm by the expandable bobbin method, as described for example in G. Grasso and F. Meli "Microbending losses of cabled single-mode fibers", ECOC '88, page 526-ff., or in G. Grasso et al. "Microbending effects in single-mode optical cables", International Wire and Cable Symposium, 1988, page 722-ff.

The low non-linearity coefficient of the fiber allows signals to be transmitted at a power large enough to handle the multiple splittings that are typically encountered in the metropolitan network.

Also, fiber 14 preferably has a low macrobending attenuation coefficient. Conventional fibers are typically expected to have a macrobending attenuation coefficient of less than about 50 dB/km for 100 turns of fiber loosely wound with a 30 mm radius, when measured at any transmission wavelength. Applicants note that a fiber of the present invention has a considerably lower macrobending attenuation coefficient, as evidenced by the examples that follow. Preferably, the macrobending attenuation coefficient is less than about 25 dB/km across both wavelength bands. More preferably, the macrobending attenuation coefficient is less than about 1 dB/km, when measured at wavelengths of less than about 1550 nm.

In accordance with the present invention, system 10 may include various optical amplifiers 20 positioned between spans of the transmission fiber 14. The amplifiers 20 may comprise erbium-doped fiber amplifiers for amplifying signals within the second wavelength band or new generation amplifiers capable of amplifying signals up to 1625 nm or around 1310 nm. As well, system 10 may include an interfacing device 18, for dropping or adding signals to system 10, particularly in a WDM configuration. Device 18 and amplifiers 20 may be of any type commonly known in the art. Finally, system 10 may include receiver 16 connected directly to optical fiber 14 or coupled to optical fiber 14 through other intermediate components. Receiver 16, as readily known in the field, may include a router, demultiplexer, and the like to assist with deciphering the information carried in the optical signals.

In accordance with the present invention, the fiber has an inner core having a first refractive index and a first glass layer surrounding the inner core. In one preferred embodiment, the refractive index difference of the first glass layer is greater than the refractive index difference of the inner core and lower than 0.0140. The refractive index profile may take any shape recognized by a skilled artisan as being capable of producing the characteristics consistent with this disclosure. For example, the refractive index profile may be a ring profile, a double peak profile, a depressed trench profile, a rounded depressed trench profiles, or a gap-step profile.

Ring Profile

Figure 4A:
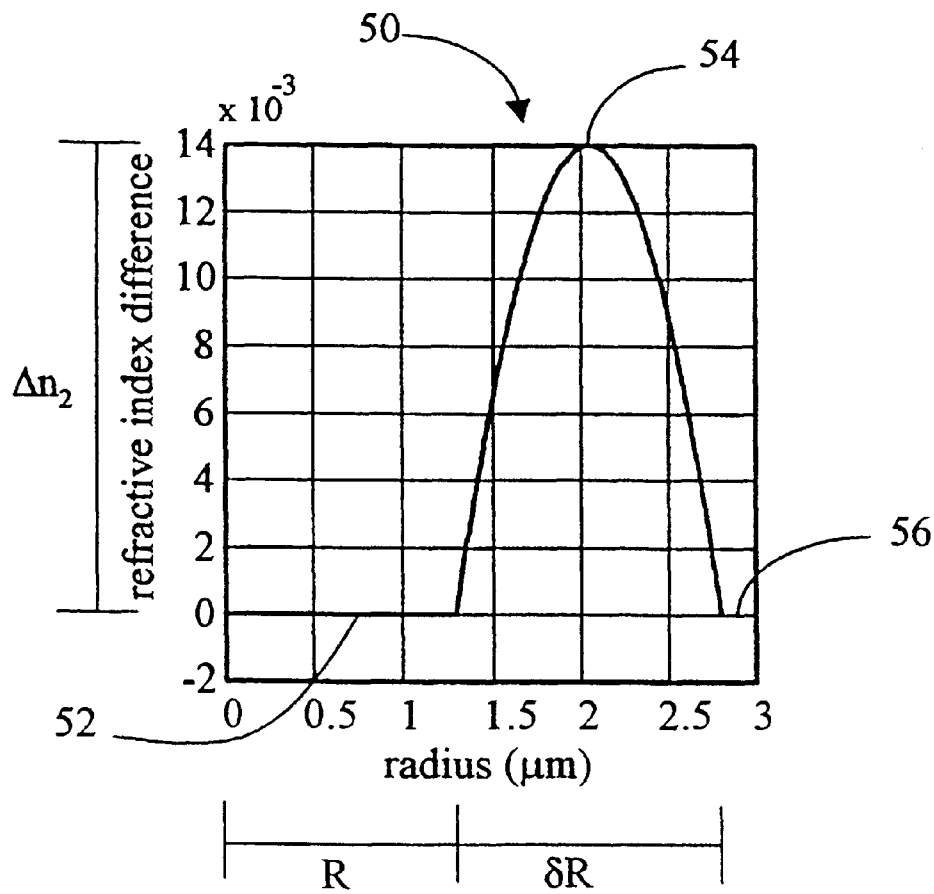
FIG. 4a is a graph illustrating a refractive index profile of a fiber having transmission characteristics in accordance with the present invention, wherein the profile has a ring shape.

As shown in FIG. 4a, the refractive index profile 50 for fiber 14 may have a ring shape. This shape is characterized by an area of constant refractive index 52 surrounded by a peak 54. As shown in the simulation described below, the fiber having the ring shape supports a data transmission rate of 10 Gbit/s without dispersion compensation.

Figure 4B:
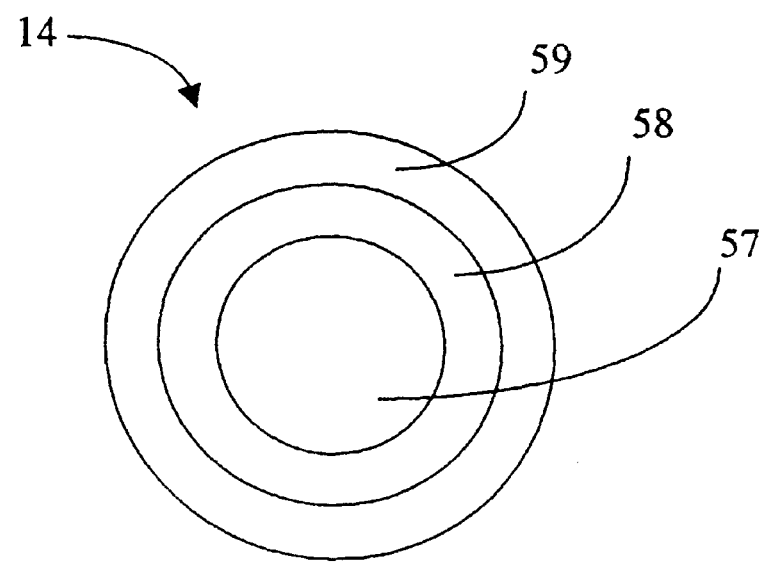

As illustrated in FIG. 4b, the cross-section of fiber 14 has an inner core 57 at the axial center of the fiber. Inner core 57 has a first refractive index difference Δn1, corresponding to area 52 of FIG. 4a and a radius R. As readily known to those of ordinary skill in the art, refractive index difference refers to the relative difference in refractive index between a given layer of glass and the refractive index of pure silica ($SiO_2$). That is, the refractive index difference$\Delta n_1$ , of inner core 52 equals ($n_1 - n_{silica}$). In this embodiment, inner core 57 is made of glass having a refractive index difference of substantially zero. Radius R is preferably between about 0.5 μm and 2.5 μm, and more preferably about 1.3 μm.

A first glass layer 58 surrounds the inner core 57 along the length of the fiber 14. First glass layer 58 has a maximum index of refraction $\Delta n_2$ (referred to as 54 in FIG. 4a) within its width that exceeds the maximum index of refraction of the glass $\Delta n_1$ within inner core 57. The refractive index difference of first glass layer 57 may be increased by doping the width of the glass layer with $GeO_2$ or any other well-known refractive index-increasing dopant. In this example, first glass layer 57 has a substantially parabolic profile across its radius that culminates in a peak 54, or maximum refractive index difference $\Delta n_2$. It should be noted that the shape of a peak in a refractive index profile is conventionally defined by an α parameter which defines the slope of the peak. For example, α=1 corresponds to a triangular profile, α=2 corresponds to a parabolic profile, and a=infinite corresponds to a step index profile. For simplicity, the disclosed outer peak 54 of first glass layer 58 has an α=2, although the peak may have an α between 1 and 3. Preferably, the index of refraction $\Delta n_2$ of first glass layer 58 at its peak 54 is preferably between about 0.0090 and 0.0140 and, more preferably, $\Delta n_2$ is about 0.0140. First glass layer 58 has a width δR that preferably is between about 0.5 μm and 2.0 μm. More preferably, δR is about 1.5 μm so that the outer radius of the first glass layer is about 2.8 μm.

A light conducting cladding 59 surrounds the first glass layer 58 in a conventional manner to help guide light propagating along the axis of fiber 14. The refractive index difference $\Delta n_3$ of cladding 59 is preferably equal to 0 (referred to as 56 in FIG. 4a). As known in the art, light conducting cladding 59 is surrounded by a non-light conducting glass layer, that extends up to a desired fiber diameter, typically 125 μm.

Table 1 summarizes the abovedescribed more preferred parameters of the fiber having a refractive index illustrated in FIGS. 4a and 4b.

TABLE 1

| $\Delta n_1$ | α | R (μm) | δR (μm) | $\Delta n_2$ |
|---|---|---|---|---|
| 0.0000 | 2 | 1.3 | 1.5 | 0.0140 |

A standard computer simulation was performed on the exemplary embodiment of the disclosed fiber to determine the resulting transmission characteristics. The simulation included determining the transmission rate limitation caused by the dispersion of the fiber. Methods of determining this limitation are well known in the art. An exemplary method is disclosed in G. P. Agrawal, Fiber Optic Communication Systems, sec. 5.2.2 pp. 199–208, which is hereby incorporated by reference in its entirety. The dispersion limitation relates the length (L) of the fiber span to the transmission bit rate (B) by the following equation:

$$B^2 * L = C$$

Where C is a constant (depending upon wavelength). Thus, at lower transmission bit rates (B) longer fiber spans fiber may be used. Similarly, higher transmission rates may be obtained using shorter fiber spans.

The following factors were again taken into account in the computer simulation:

Single pulse broadening due to fiber chromatic dispersion.

Single pulse broadening due to fiber chromatic dispersion slope.

Single pulse broadening due to fiber PMD (0.1 ps/√km).

External modulation regime.

No dispersion compensation.

As shown in Table 2 below, the fiber 14 of FIGS. 4a and 4b exhibited desirable dispersion characteristics in both the first and second wavelength bands. In particular, the cabled fiber had a simulated cut-off wavelength less than about 1250 nm, ensuring single-mode operation at both transmission windows. As well, the refractive index profile produced dispersion at around 1310 nm of −11.3 ps/nm/km and at around 1550 nm of +7.5 ps/nm/km. The zero dispersion wavelength, $\lambda_0$, was about 1440 nm. Based on the simulation results, Applicants have determined that the fiber 14 of FIGS. 4a and 4b supported a maximum bit rate of 10 Gbit/s across the first wavelength band and up to a wavelength of greater than 1600 nm across the second wavelength band, when considering a 50 km length of fiber without dispersion compensation and with external modulation. Table 2 summarizes these results.

TABLE 2

| Operating Wavelength | 1310 nm | 1550 nm | 1600 nm | 1625 nm |
|---|---|---|---|---|
| Dispersion (ps/nm/km) | −11.3 | +7.5 | +10.7 | +12.2 |
| Dispersion Slope (ps/nm²/km) | 0.10 | 0.06 | 0.06 | 0.06 |
| Macrobending Attenuation Coefficient (dB/km) | <10⁻³ | 10⁻¹ | 2 | 5 |
| Microbending sensitivity (dB/km)/(g/mm) | 1 | 2 | 3 | 3 |
| MFD (μm) | 7.2 | 8.8 | 9.1 | 9.3 |
| Effective Area (μm²) | 48 | 64 | 69 | 71 |
| Non-linearity Coefficient (W⁻¹m⁻¹) | 2.5 | 1.4 | 1.2 | 1.1 |
| Cabled Cut-off Wavelength (nm) | ≦1250 | | | |
| Zero Dispersion Wavelength (nm) | 1440 | | | |

Double Peak Profile

Figure 5A:
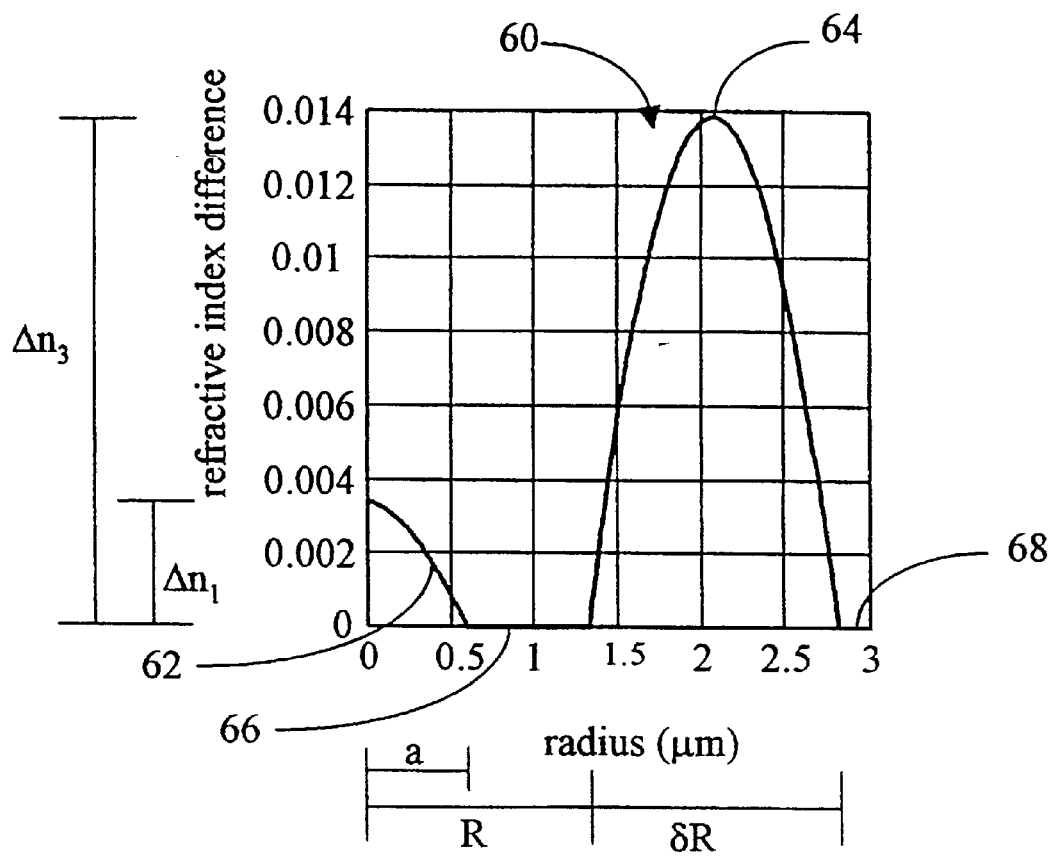
FIG. 5a is a graph illustrating the refractive index profile of a fiber having transmission characteristics in accordance with the present invention, wherein the profile has a double-peak shape.

As shown in FIG. 5a, the refractive index profile 60 of fiber 14 may be a double-peak profile. The double-peak profile is characterized by a first peak 62 and a second peak 64. First peak 62, which has a first refractive index difference $\Delta n_1$ is separated from second peak 64, which has a second refractive index difference $\Delta n_3$ by an area having a constant refractive index 66. The refractive index difference of second peak 64 is greater than the refractive index difference of first peak 62. As shown in the simulation described below, the fiber having the double-peak profile supports a data transmission rate of 10 Gbit/s without dispersion compensation.

Figure 5B:
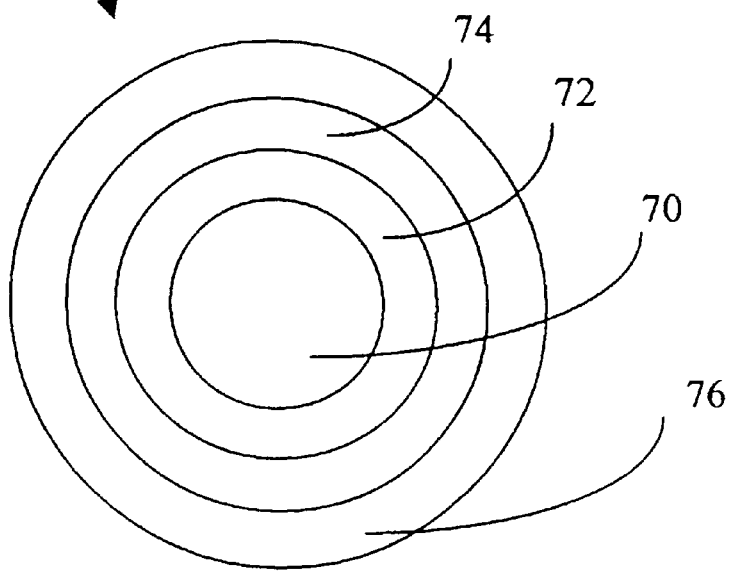

As shown in FIG. 5b, fiber 14 includes an inner core 70, a first glass layer 72, a second glass layer 74, and a cladding 76. Inner core 70 has a radius "a" (referring to FIG. 5a) that preferably is between about 0.5 μm and 2.0 μm. More preferably, a is about 0.6 μm. Between the center of the fiber and the radial position at 0.6 μm, inner core 70 includes a refractive index-increasing dopant such as $GeO_2$ or the like that produces a peak index of refraction at or near the axial center of fiber 14 and a minimum for the inner core at its outer radius. At the peak, the index of refraction $\Delta n_1$ for inner core 70 is preferably between about 0.0020 and 0.0060. More preferably, $\Delta n_1$ is about 0.0034. The concentration of the refractive index-increasing dopant decreases from the center of inner core 70 to the outer radius at about 0.6 μm in a manner to produce a profile having a curved slope that resembles a substantially parabolic shape. Preferably, according to a graded index a profile, the curved slope has an α between about 1 and 4. More preferably, α is about 1.7.

A first glass layer 72 surrounds the inner core 70 and is characterized by an index of refraction across its width that is less than the indices of refraction along the radius of inner core 70. Preferably, first glass layer 72 is made of glass with a refractive index difference of substantially zero, i.e., less than about 0.0010 in absolute value. First glass layer 72 has an outer radius R that is preferably between about 1.0 μm and 2.0 μm. More preferably, R is about 1.3 μm.

The second glass layer 74 surrounds the first glass layer 72 along the length of the fiber 14. Second glass layer 74 has a width δR that is preferably between about 1.0 μm and 2.0 μm. More preferably, δR is about 1.5 μm so that the outer radius of second glass layer 74 is about 2.8 μm. As shown in FIG. 5a, second glass layer 74 has a maximum index of refraction $\Delta n_3$ within its width that exceeds the maximum index of refraction of the glass $\Delta n_1$ within inner core 70. Second glass layer 74, like inner core 70, has its refractive index difference increased by doping the width of the glass layer with $GeO_2$ or other well-known refractive index-increasing dopants. Preferably, second glass layer 74 has an α profile, where α is between 1 and 4 and the maximum refractive index difference $\Delta n_3$ is between about 0.0090 and 0.0140. More preferably, second glass layer 74 has as α of 2 and a maximum refractive index difference $\Delta n_3$ of about 0.0138.

Finally, a light conducting cladding 76 surrounds the second glass layer 74 in a conventional manner to help guide light propagating along the axis of fiber 14. The refractive index difference Δn of cladding 76 is preferably equal to 0 (referred to as 68 in FIG. 5a).

Table 3 summarizes the more preferred parameters of a fiber having an index profile illustrated in FIGS. 5a and 5b.

TABLE 3

| a (μm) | $\Delta n_1$ | α | R (μm) | δR (μm) | $\Delta n_3$ |
|---|---|---|---|---|---|
| 0.6 | 0.0034 | 1.7 | 1.3 | 1.5 | 0.0138 |

A computer simulation, as described for the ring profile was performed to determine the transmission characteristics of this embodiment of the fiber. As shown in Table 4 below, the fiber 14 of FIGS. 5a and 5b exhibited desirable dispersion characteristics in both the first and second wavelength bands. In particular, the cabled fiber had a simulated cut-off wavelength less than about 1250 nm, ensuring single-mode operation at both transmission windows. As well, the refractive index profile produced dispersion at around 1310 nm of −10.7 ps/nm/km and at around 1550 nm of +7.9 ps/nm/km. The zero dispersion wavelength, $\lambda_0$, was about 1435 nm. Based on the simulation results, Applicants have determined that the fiber 14 of FIGS. 5a and 5b supported a maximum bit rate of 10 Gbit/s across the first wavelength band and up to a wavelength of greater than 1600 nm across the second wavelength band, when considering a 50 km length of fiber without dispersion compensation and with external modulation. Table 4 summarizes these results.

TABLE 4

| Operating Wavelength | 1310 nm | 1550 nm | 1600 nm | 1625 nm |
|---|---|---|---|---|
| Dispersion (ps/nm/km) | −10.7 | +7.9 | +10.8 | +12.3 |
| Dispersion Slope (ps/nm²/km) | 0.10 | 0.06 | 0.06 | 0.06 |
| Macrobending Attenuation Coefficient (dB/km) | <10⁻³ | 10⁻¹ | 5 | 12 |
| Microbending sensitivity (dB/km)/(g/mm) | 1 | 2 | 3.0 | 4 |
| MFD ($\mu$m) | 7.3 | 8.9 | 9.2 | 9.4 |
| Effective Area ($\mu$m²) | 49 | 65 | 70 | 72 |
| Non-linearity Coefficient (W⁻¹m⁻¹) | 2.5 | 1.3 | 1.2 | 1.1 |
| Cabled Cut-off Wavelength (nm) | | ≦1250 | | |
| Zero Dispersion Wavelength (nm) | | 1435 | | |

Depressed Trench Profile

Figure 6A:
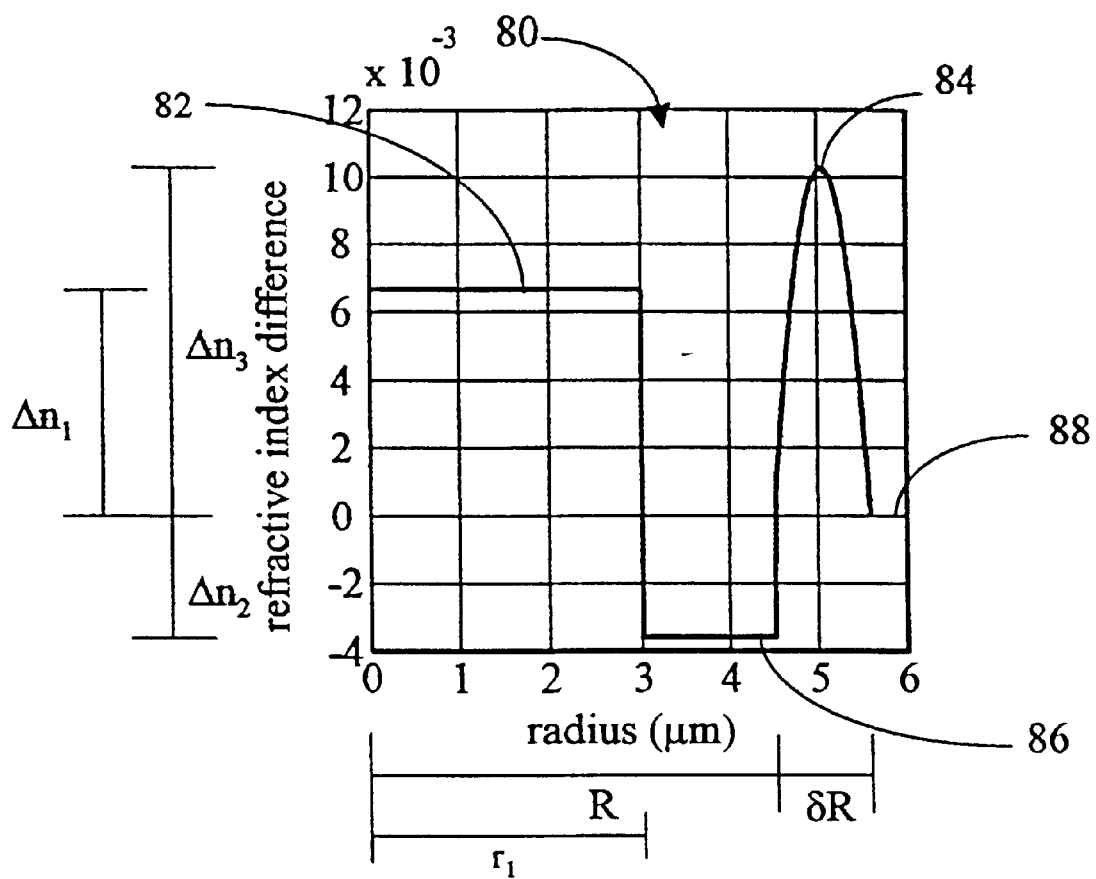
FIG. 6a is a graph illustrating the refractive index profile of a fiber having transmission characteristics in accordance with the present invention, wherein the profile has a depressed trench.

As shown in FIG. 6a, the refractive index profile 80 for fiber 14 may have a depressed trench. This profile is characterized by an area of negative refractive $\Delta n_2$ index 86. In the illustrated example, the area of negative refractive index 86 is surrounded by an area of constant refractive index 82 and a peak 84. The area of constant refractive index 82 has a first refractive index $\Delta n_1$ which is less than the refractive index $\Delta n_3$ of peak 84. More in general, the profile of constant refractive index area 82 and/or of negative refractive index area 86 may correspond to a rounded profile shape. A step profile may be used as a guideline to evaluate an equivalent rounded shape profile. As shown in the simulation described below, the fiber having the depressed trench profile supports a data transmission rate of 10 Gbits/s without dispersion compensation.

Figure 6B:
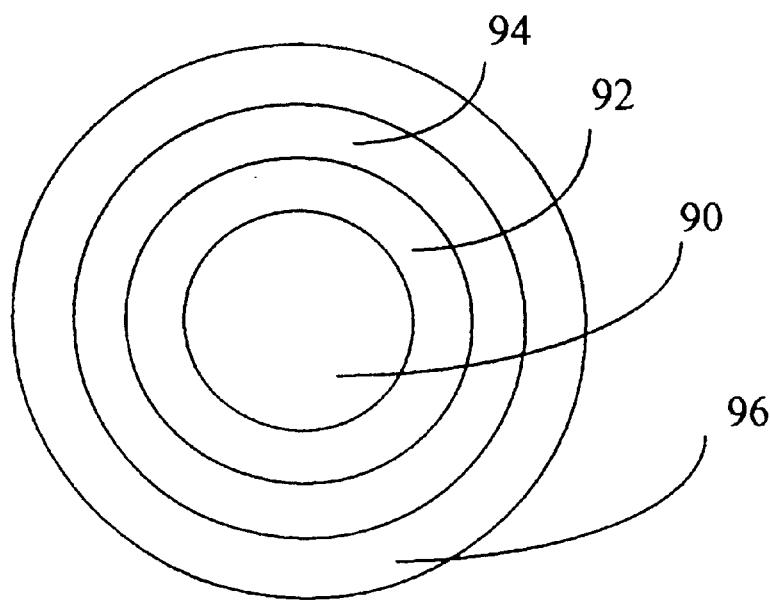

As illustrated in FIG. 6b, the fiber 14 has an inner core 90, a first glass layer 92, a second glass layer 94 and a cladding 96. Inner core 90 has a radius $r_1$ that is preferably about 3.0 $\mu$m. Preferably, the innercore has an increased refractive index difference, which may be achieved by doping the width of the inner core with $GeO_2$ or other well-known refractive index-increasing dopants. Preferably, inner core has a constant refractive index difference $\Delta n_1$ that is about 0.0066.

The first glass layer 92 surrounds inner core 90 and is characterized by a depressed refractive index difference $\Delta n_2$ that is less than the refractive index difference $\Delta n_1$ of the inner core 90. The first glass layer has its refractive index decreased by doping the width of the glass layer with a refractive index-decreasing dopant, such as fluorine. Preferably, first glass layer 92 has a radius of about 1.5 $\mu$m, and the refractive index difference $\Delta n_2$ of first glass layer is about −0.0036.

The second glass layer 94 surrounds the first glass layer 92 along the length of the fiber 14. Second glass layer 94 has a width $\delta R$ that preferably is preferably about 1.1 $\mu$m, so that the outer radius of second glass layer 34 is about 5.6 $\mu$m. As shown in FIG. 6a, second glass layer 94 has a maximum index of refraction $\Delta n_3$ within its width that exceeds the maximum index of refraction of the glass $\Delta n_1$ within inner core 90. Second glass layer 94, like inner core 90, has its refractive index difference increased by doping the width of the glass layer with $GeO_2$ or any other well-known refractive index-increasing dopant. Preferably, second glass layer 94 has a substantially parabolic profile ($\alpha$=2) across its radius, that culminates in a maximum refractive index difference $\Delta n_3$, which is preferably of about 0.0102.

Finally, a light conducting cladding 96 surrounds the second glass layer 94 in a conventional manner to help guide light propagating along the axis of fiber 14. The refractive index difference $\Delta n$ of cladding 96 is preferably equal to 0 (referred to as 88 in FIG. 6a).

Table 5 summarizes the parameters of a fiber having an index profile illustrated in FIGS. 6a and 6b.

TABLE 5

| $r_1$ ($\mu$m) | $\Delta n_1$ | $\Delta n_2$ | R ($\mu$m) | $\delta R$ ($\mu$m) | $\Delta n_3$ |
|---|---|---|---|---|---|
| 3.0 | 0.0066 | −0.0036 | 4.5 | 1.1 | 0.0102 |

A computer simulation, as previously described, was performed to determine the transmission characteristics of this embodiment of the fiber. As shown in Table 6 below, the fiber 14 of FIGS. 6a and 6b exhibited desirable dispersion characteristics at both the first and the second wavelength bands. In particular, the cabled fiber had a simulated cut-off wavelength less than about 1250 nm, ensuring single-mode operation at both transmission windows. As well, the refractive index profile produced dispersion at around 1310 nm of −11.7 ps/nm/km and at around 1550 nm of +8.4 ps/nm/km. The zero dispersion wavelength, $\lambda_0$, was about 1443 nm. Based on the simulation results, Applicants have determined that the fiber 14 of FIGS. 6a and 6b supported a maximum bit rate of 10 Gbit/s across the first wavelength band and up to a wavelength of greater than 1565 nm across the second wavelength band, when considering a 50 km length of fiber without dispersion compensation and with external modulation. Table 6 summarizes these results.

TABLE 6

| Operating Wavelength | 1310 nm | 1550 nm | 1600 nm | 1625 nm |
|---|---|---|---|---|
| Dispersion (ps/nm/km) | −11.7 | +8.4 | +12.1 | +13.9 |
| Dispersion Slope (ps/nm²/km) | 0.09 | 0.07 | 0.07 | 0.07 |
| Macrobending Attenuation Coefficient (dB/km) | <10⁻³ | 10⁻¹ | 5.0 | 11 |
| Microbending sensitivity (dB/km)/(g/mm) | 1 | 5 | 7 | 8 |
| MFD ($\mu$m) | 7.9 | 9.8 | 10.3 | 10.6 |
| Effective Area ($\mu$m²) | 50 | 76 | 85 | 88 |
| Non-linearity Coefficient (W⁻¹m⁻¹) | 2.5 | 1.1 | 1.0 | 0.9 |
| Cabled Cut-off Wavelength (nm) | | ≦1250 | | |
| Zero Dispersion Wavelength (nm) | | 1445 | | |

Rounded Depressed Trench Profile

Figure 7A:
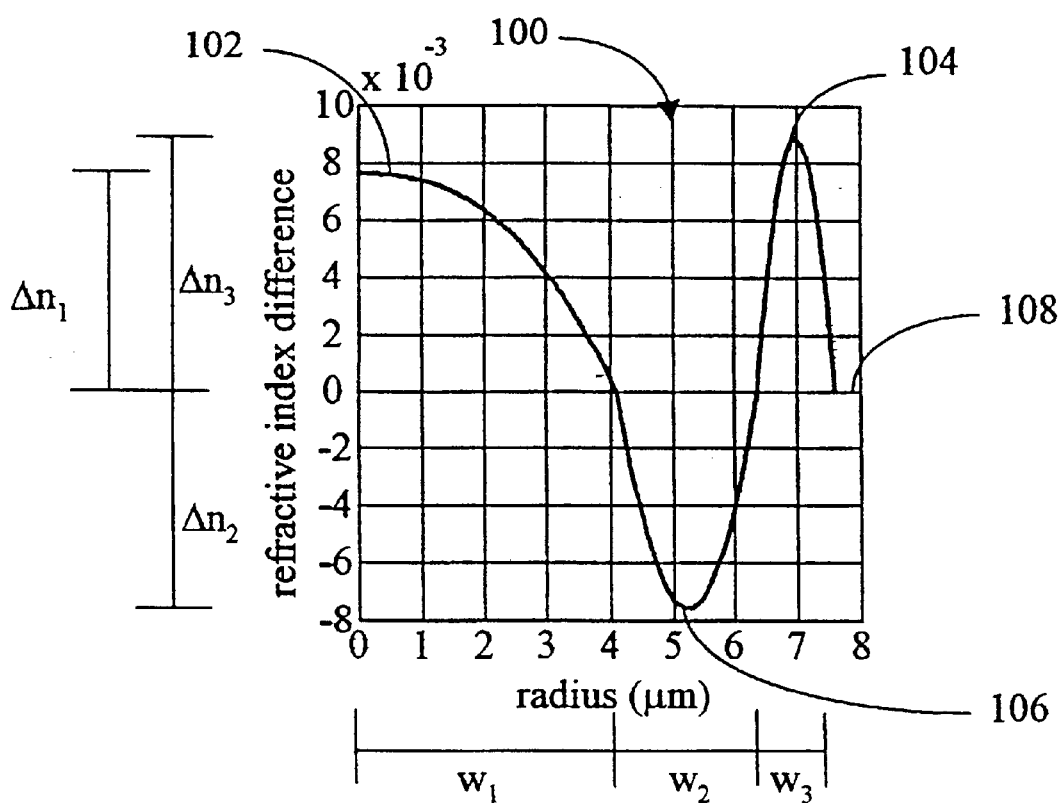
FIG. 7a is a graph illustrating the refractive index profile of a fiber having transmission characteristics in accordance with the present invention, wherein the profile has a rounded depressed trench.

As shown in FIG. 7a, the refractive index profile 100 for fiber 14 may have a rounded-depressed trench profile. This profile is characterized by an area of negative refractive $\Delta n_2$ index 106 having an $\alpha$ profile shape, surrounding a first peak 102 and surrounded by a second peak 104. First peak 102 has a first refractive index $\Delta n_1$ which is less than the maximum refractive index $\Delta n_3$ of second peak 104. As shown in the simulation described below, the fiber having the rounded-depressed trench profile supports a data transmission rate of up to 10 Gbits/sec.

Figure 7B:
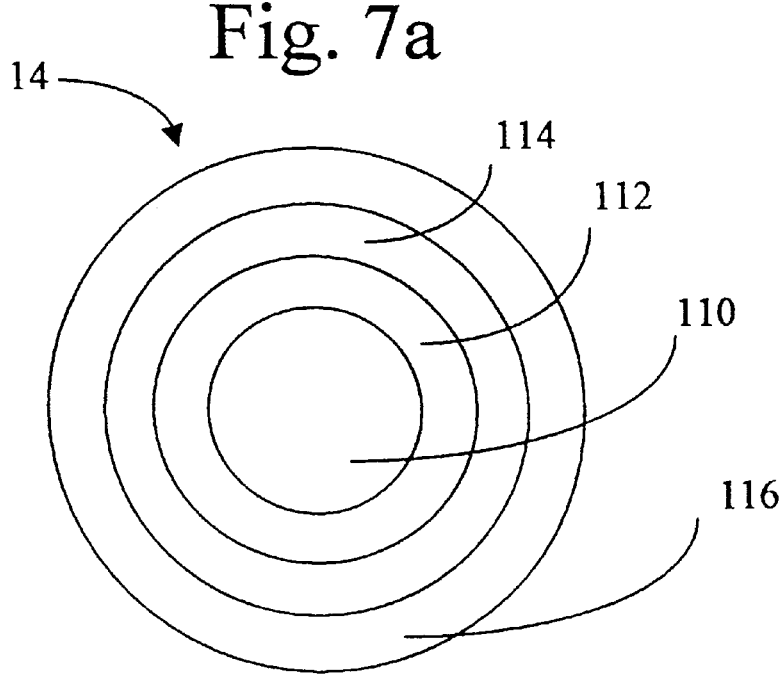

As illustrated in FIG. 7b, the fiber 14 has an inner core 110, a first glass layer 112, a second glass layer 114 and a cladding 116. Inner core 110 has a radius $w_1$, that is preferably between about 2.5 µm and 5.5 µm and more preferably between about 2.5 µm and 4.5 µm. Even more preferably, radius $w_1$ is about 3.5 µm. Between the center of the fiber and the radial position at 3.5 µm, inner core 110 includes a refractive index-increasing dopant such as $GeO_2$ or the like that produces a peak index of refraction at or near the axial center of fiber 14 and a minimum for the inner core at its outer radius. At the peak, the index of refraction $\Delta n_1$ for inner core 110 is preferably between about 0.0060 and 0.0120 and more preferably between about 0.0060 and 0.0080. Even more preferably, $\Delta n_1$ is about 0.0070. The concentration of the refractive index-increasing dopant decreases from the center of inner core 110 to the outer radius in a manner to produce a profile having a curved slope that substantially corresponds to an α profile. Preferably $\alpha_1$ is between 1 and 10, more preferably between 4 and 6. Even more preferably, $\alpha_1=5$.

The first glass layer 112 surrounds inner core 110 along the width of fiber 14 and is characterized by a rounded-depressed refractive index difference $\Delta n_2$ that is less than the refractive index difference $\Delta n_1$ of the inner core 110. The first glass layer has its refractive index decreased by doping the width of the glass layer with a refractive index-decreasing dopant, such as fluorine. Preferably, the minimum refractive index difference $\Delta n_2$ of first glass layer is between about −0.0050 and −0.0002, more preferably between about −0.0040 and −0.0020. Even more preferably, $\Delta n_2$ is about −0.0026. Preferably, first glass layer 112 has a profile α across its radius, with $\alpha_2$ between 1 and 10, more preferably between 1 and 3. Even more preferably, $\alpha_2=2$. Preferably, first glass layer 112 has a width $w_2$ of between about 0.5 µm and 5.5 µm, more preferably between about 1.0 µm and 3.0 µm. Even more preferably, width $w_2$ is about 1.9 µm and thus first glass layer 112 extends to about 5.4 µm.

The second glass layer 114 surrounds the first glass layer 112 along the length of the fiber 14. Second glass layer 114 has a width $w_3$ that preferably is between about 0.4 µm and 3.0 µm, more preferably is between about 0.5 µm and 1.5 µm. Even more preferably, width $w_3$ is about 1.0 µm, so that the outer radius of second glass layer 114 is about 6.4 µm. As shown in FIG. 7a, second glass layer 114 has a maximum index of refraction $\Delta n_3$ within its width that exceeds the maximum index of refraction of the glass Δn, within inner core 110. Second glass layer 114, like inner core 110, has its refractive index difference increased by doping the width of the glass layer with $GeO_2$ or other well-known refractive index-increasing dopants. Preferably, second glass layer 114 has a profile a across its radius, with $\alpha_3$ between 1 and 10 and more preferably between 1 and 3, that culminates in a maximum refractive index difference $\Delta n_3$, which is preferably between about 0.0060 and 0.0120, more preferably between about 0.0070 and 0.0100. Even more preferably, $\alpha_3=2$ and the maximum refractive index difference $\Delta n_3$ is about 0.0080.

Finally, a light conducting cladding 116 surrounds the second glass layer in a conventional manner to help guide light propagating along the axis of fiber 14. The refractive index difference Δn of cladding 116 is preferably equal to 0 (referred to as 108 in FIG. 7a).

Table 7 summarizes the parameters of a fiber having an index profile illustrated in FIGS. 7a and 7b.

TABLE 7

| $\alpha_1$ | $w_1$ (µm) | $\Delta n_1$ | $\alpha_2$ | $w_2$ (µm) | $\Delta n_2$ | $\alpha_3$ | $w_3$ (µm) | $\Delta n_3$ |
|---|---|---|---|---|---|---|---|---|
| 5 | 3.5 | 0.0070 | 2 | 1.9 | −0.0026 | 2 | 1.0 | 0.0080 |

A computer simulation, as previously described, was performed to determine the transmission characteristics of this embodiment of the fiber. As shown in Table 8 below, the fiber 14 of FIGS. 7a and 7b exhibited desirable dispersion characteristics in both the first and the second wavelength bands. In particular, the cabled fiber had a simulated cut-off wavelength less than about 1250 nm, ensuring single-mode operation at both transmission windows. As well, the refractive index profile produced dispersion at around 1310 nm of −10.1 ps/nm/km and at around 1550 nm of +7.1 ps/nm/km. The zero dispersion wavelength, $\lambda_0$, was about 1445 nm. Based on the simulation results, Applicants have determined that the fiber 14 of FIGS. 7a and 7b supported a maximum bit rate of 10 Gbit/s across the first wavelength band and up to a wavelength of greater than 1600 nm across the second wavelength band, when considering a 50 km length of fiber without dispersion compensation and with external modulation. Table 8 summarizes these results.

TABLE 8

| Operating Wavelength | 1310 nm | 1550 nm | 1600 nm | 1625 nm |
|---|---|---|---|---|
| Dispersion (ps/nm/km) | −10.1 | 7.1 | 10.5 | 12.1 |
| Dispersion Slope (ps/nm²/km) | 0.08 | 0.07 | 0.06 | 0.06 |
| Macrobending Attenuation Coefficient (dB/km) | <10⁻³ | 0.1 | 1.0 | 3 |
| Microbending sensitivity (dB/km)/(g/mm) | 1 | 3 | 4.0 | 5 |
| MFD (µm) | 7.6 | 9.3 | 9.7 | 9.9 |
| Effective Area (µm²) | 44 | 66 | 72 | 75 |
| Non-linearity Coefficient ($W^{-1}m^{-1}$) | 2.8 | 1.3 | 1.1 | 1.0 |
| Cabled Cut-off Wavelength (nm) | ≦1250 | | | |
| Zero Dispersion Wavelength (nm) | 1445 | | | |

Gap-Step Profile

Figure 8A:
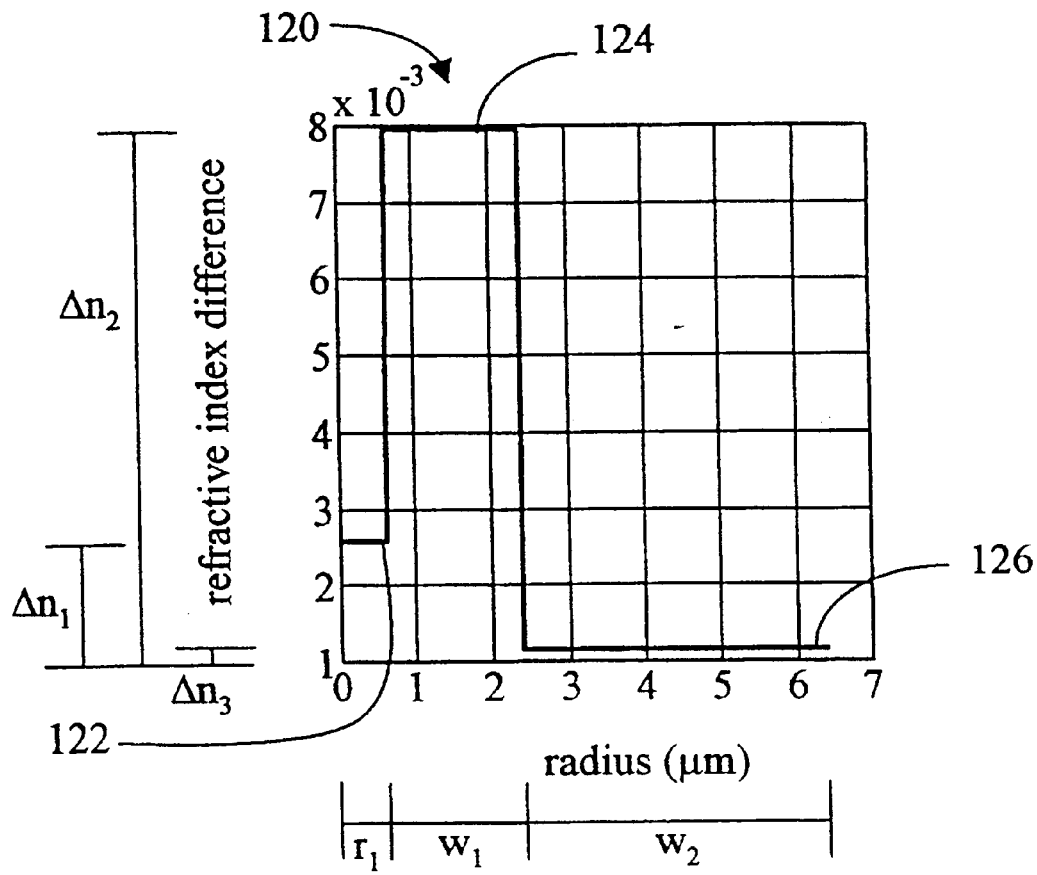
FIG. 8a is a graph illustrating the refractive index profile of a fiber having transmission characteristics in accordance with the present invention, wherein the profile has a gap-step shape.

As shown in FIG. 8a, the refractive index profile 120 of fiber 14 may be a gap-step profile. It should be noted that the exemplary gap-step profile may be generalized to a rounded profile shape. The gap-step profile is characterized by successive areas of substantially constant refractive index. In the exemplary embodiment, refractive index profile 120 includes a first area 122 having a first refractive index difference $\Delta n_1$, a second area 124 having a second refractive index difference $\Delta n_2$, and a third area 126 having a third refractive index difference $\Delta n_3$. The refractive index difference $\Delta n_2$ of second area 124 is greater than the refractive index differences $\Delta n_1$ and $\Delta n_3$ of the first and third areas 122 and 126, respectively. As shown in the simulation described below, the fiber having the gap-step profile supports a data transmission rate of 10 Gbit/s without dispersion compensation.

Figure 8B:
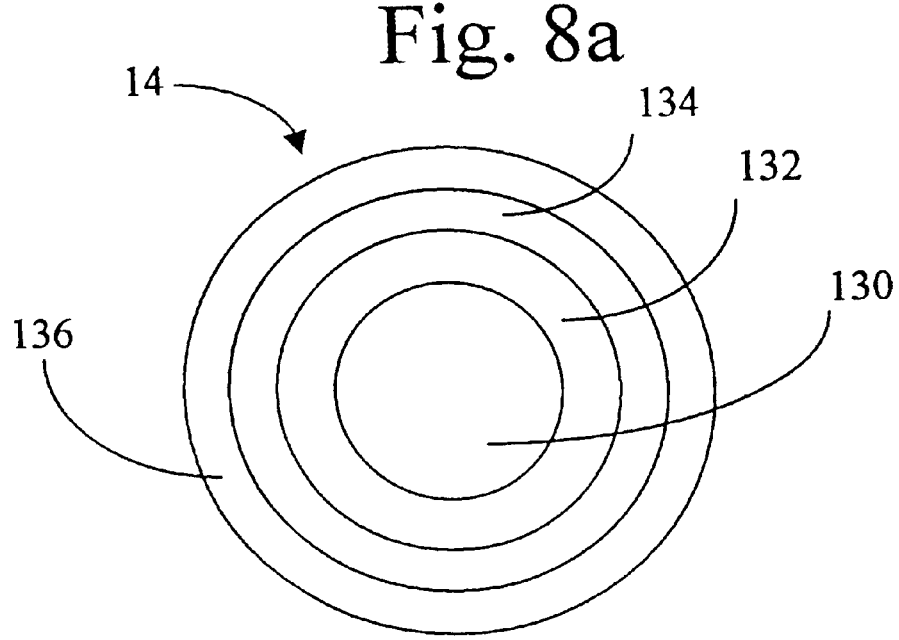

As shown in FIG. 8b, fiber 14 includes an inner core 130, a first glass layer 132, and a second glass layer 134. Inner core 130 has a radius r, (referring to FIG. 8a) that preferably is between about 0.5 µm and 1.0 µm. More preferably, radius $r_1$ is about 0.6 µm. Inner core 130 includes a refractive index-increasing dopant such as $GeO_2$ or the like that produces a substantially constant index of refraction across the width of the inner core. Preferably, the index of refraction $\Delta n_1$ for inner core 130 is between about 0 and 0.0030. More preferably, $\Delta n_1$ is about 0.0026.

A first glass layer 132 surrounds the inner core 130 and is characterized by an index of refraction across its width that is greater than the indices of refraction along the radius of inner core 132. Preferably, first glass layer 132, like the inner core, 130 includes a refractive index-increasing dopant such as $GeO_2$ or the like that produces a substantially constant index of refraction across the width of the inner core. Preferably, the index of refraction $\Delta n_2$ for first glass layer 132 is between about 0.0060 and 0.0090. More preferably, index of refraction $\Delta n_2$ is about 0.0079. First glass layer 132 extends for a radius $w_1$ that is preferably about 1.5 μm to 2.5 μm. More preferably, radius $w_1$ is about 1.8 μm and thus extends to an outer radius that is about 2.4 82 m.

The second glass layer 134 surrounds the first glass layer 132 along the length of the fiber 14. Second glass layer 134 has a width $w_2$ that preferably is between about 1.0 μm and 8.0 μm. More preferably, width $w_2$ is about 4.0 μm, so that the outer radius of second glass layer 134 is about 6.4 μm. Second glass layer 134, like inner core 130, has its refractive index difference increased by doping the width of the glass layer with $GeO_2$ or other well-known refractive index-increasing dopants. In this example, second glass layer 134 has a substantially constant refractive index difference $\Delta n_3$, which is preferably between about 0 and 0.0040. More preferably, refractive index difference $\Delta n_3$ is about 0.0012.

Finally, a light conducting cladding 136 surrounds the second glass layer in a conventional manner to help guide light propagating along the axis of fiber 14. The refractive index difference $\Delta n$ of cladding 136 is preferably equal to 0 (not shown in FIG. 8a).

Table 9 summarizes the more preferred parameters of a fiber having an index profile illustrated in FIGS. 8a and 8b.

TABLE 9

| $R_1$ (μm) | $w_1$ (μm) | $w_2$ (μm) | $\Delta n_1$ | $\Delta n_2$ | $\Delta n_3$ |
| --- | --- | --- | --- | --- | --- |
| 0.6 | 1.8 | 4.0 | 0.0026 | 0.0079 | 0.0012 |

A computer simulation, as previously described, was performed to determine the transmission characteristics of this embodiment of the fiber. As shown in Table 10 below, the fiber 14 of FIGS. 8a and 8b exhibited desirable dispersion characteristics in both the first and the wavelength bands. In particular, the cabled fiber had a simulated cut-off wavelength less than about 1250 nm, ensuring single-mode operation at both transmission windows. As well, the refractive index profile produced dispersion at around 1310 nm of −9.2 ps/nm/km and at around 1550 nm of +9.5 ps/nm/km. The zero dispersion wavelength, $\lambda_0$, was about 1420 nm. Based on the simulation results, Applicants have determined that the fiber 14 of FIGS. 8a and 8b supported a maximum bit rate of 10 Gbit/s across the first wavelength band and up to a wavelength of greater than 1565 nm across the second wavelength band, when considering a 50 km length of fiber without dispersion compensation and with external modulation. Table 10 summarizes these results.

TABLE 10

| Operating Wavelength | 1310 nm | 1550 nm | 1600 nm | 1625 nm |
| --- | --- | --- | --- | --- |
| Dispersion (ps/nm/km) | −9.2 | +9.5 | +12.8 | +14.5 |
| Dispersion Slope (ps/nm$^2$/km) | 0.10 | 0.07 | 0.06 | 0.06 |
| Macrobending Attenuation Coefficient (dB/km) | <10$^{-3}$ | 0.1 | 1 | 2 |
| Microbending sensitivity (dB/km)/(g/mm) | 1 | 2 | 3 | 4 |
| MFD (μm) | 7.8 | 9.4 | 9.8 | 10.0 |
| Effective Area (μm$^2$) | 46 | 66 | 72 | 74 |
| Non-linearity Coefficient (W$^{-1}$m$^{-1}$) | 2.6 | 1.3 | 1.1 | 1.1 |
| Cabled Cut-off Wavelength (nm) | ≦1250 | | | |
| Zero Dispersion Wavelength (nm) | 1420 | | | |

A second preferred embodiment of the present invention will now be described. In this embodiment, the fiber exhibits transmission characteristics as disclosed above. However, in this embodiment, the inner core of the fiber has a refractive index difference that is greater than the refractive index difference of the first glass layer. In addition, the refractive index difference of the first glass layer is greater than zero. Applicants have found that advantageous transmission characteristics as above disclosed for a metropolitan fiber can be achieved in a fiber according to this second embodiment. In this second embodiment the refractive index difference of the inner core is comprised between about 0.0060 and about 0.0090.

The possible shapes of the refractive index profile according to the second embodiment include, but are not limited to, peak on pedestal profiles, peak-and-ring profiles and peak-and-ring profiles with depressed trench.

Peak on Pedestal Profile

Figure 9A:
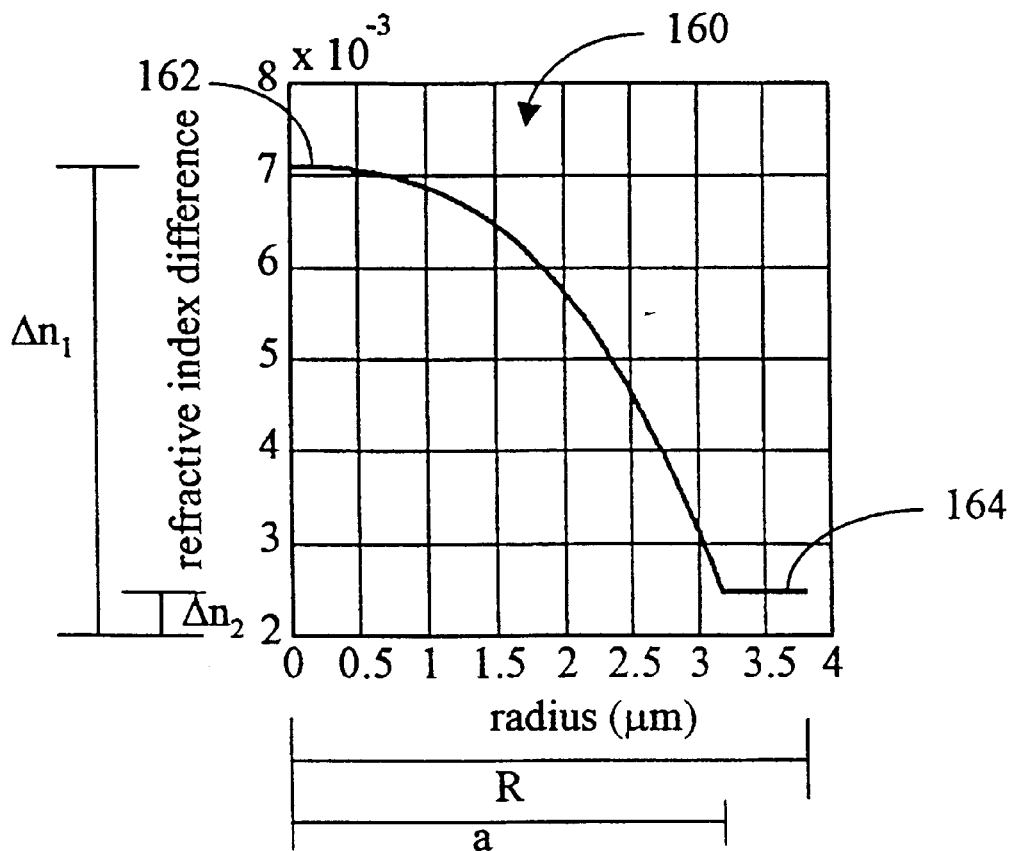
FIG. 9a is a graph illustrating a peak on pedestal refractive index profile of a fiber having transmission characteristics in accordance with the present invention.

As shown in FIG. 9a, the refractive index profile 160 of fiber 14 may be a peak on pedestal profile. The peak on pedestal profile is characterized by a first peak 162 and an area of constant refractive index 164. The refractive index difference $\Delta n_1$ of first peak 162 is greater than the refractive index difference of area of constant refractive index 164. As shown in the simulation described below, the fiber having the peak on pedestal profile supports a data transmission rate of 10 Gbit/s without dispersion compensation.

Figure 9B:
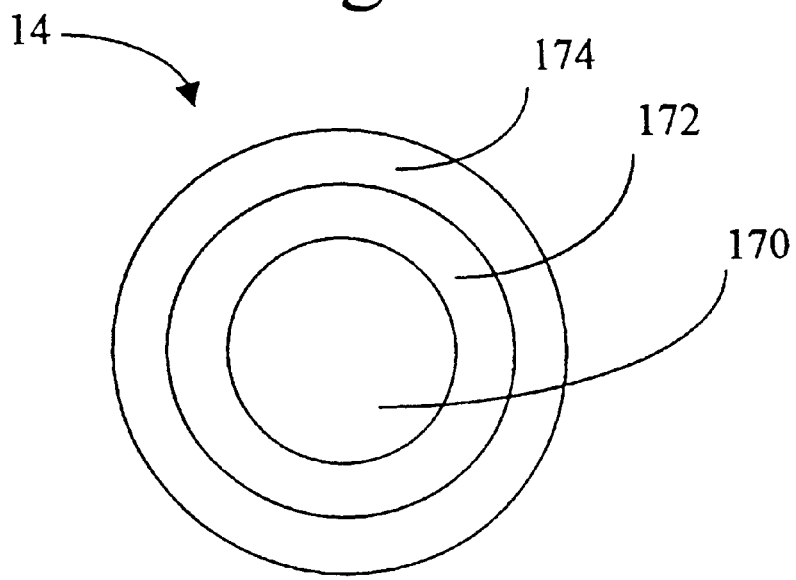

As shown in FIG. 9b, fiber 14 includes an inner core 170, a first glass layer 172, and a cladding 174. Inner core 170 has a radius "a" (referring to FIG. 9a) that preferably is between about 2.0 μm and 4.0 μm. More preferably, a is about 3.2 μm. Between the center of the fiber and the radial position at 3.2 μm, inner core 170 includes a refractive index-increasing dopant such as $GeO_2$ or the like that produces a peak index of refraction at or near the axial center of fiber 14 and a minimum for the inner core at its outer radius. At the peak, the index of refraction $\Delta n_1$ for inner core 170 is preferably between about 0.0060 and 0.0090. More preferably, $\Delta n_1$ is about 0.0071. The concentration of the refractive index-increasing dopant decreases from the center of inner core 170 to the outer radius at about 3.2 μm in a manner to produce a profile having a curved slope that resembles a substantially parabolic shape. Preferably, according to a graded index a profile, the curved slope has an α between about 2 and 3. More preferably, α is about 2.6.

A first glass layer 172 surrounds the inner core 170 and is characterized by an index of refraction across its width that is less than the indices of refraction along the radius of inner core 170. The first glass layer 172 surrounds the inner core 170 along the length of the fiber 14. First glass layer 172 has an outer radius R that preferably is between about 3.0 μm and 5.0 μm. More preferably, R is about 3.8 μm. As shown in FIG. 9a, first glass layer 172 has a substantially constant index of refraction $\Delta n_2$ across its radius. First glass layer 172, like inner core 170, has its refractive index difference increased by doping the width of the glass layer with $GeO_2$ or other well-known refractive index-increasing dopants. Preferably, first glass layer 172 has refractive index difference $\Delta n_2$ of about 0.0020 to 0.0050. More preferably, refractive index difference $\Delta n_2$ is about 0.0025.

Finally, a light conducting cladding 174 surrounds the first glass layer 172 in a conventional manner to help guide light propagating along the axis of fiber 14. The refractive index difference $\Delta n$ of cladding 174 is preferably equal to 0 (not shown in FIG. 9a).

Table 11 summarizes the parameters of a fiber having an index profile illustrated in FIGS. 9a and 9b.

TABLE 11

| a (μm) | $\Delta n_1$ | α | R (μm) | $\Delta n_2$ |
|---|---|---|---|---|
| 3.2 | 0.0071 | 2.6 | 3.8 | 0.0025 |

A computer simulation, as previously described, was performed to determine the transmission characteristics of this embodiment of the fiber. As shown in Table 12 below, the fiber 14 of FIGS. 9a and 9b exhibited desirable dispersion characteristics in both the first and the wavelength bands. In particular, the cabled fiber had a simulated cut-off wavelength less than about 1250 nm, ensuring single-mode operation at both transmission windows. As well, the refractive index profile produced dispersion at around 1310 nm of −6.0 ps/nm/km and at around 1550 nm of +10.9 ps/nm/km. The zero dispersion wavelength, $\lambda_0$, was about 1385 nm. Based on the a simulation results, Applicants have determined that the fiber 14 of FIGS. 9a and 9b supported a maximum bit rate of 10 Gbit/s across the first wavelength band and up to a wavelength of greater than 1565 nm across the second wavelength band, when considering a 50 km length of fiber without dispersion compensation and with external modulation. Table 12 summarizes these results.

TABLE 12

| Operating Wavelength | 1310 nm | 1550 nm | 1600 nm | 1625 nm |
|---|---|---|---|---|
| Dispersion (ps/nm/km) | −6.0 | +10.9 | +13.9 | +15.3 |
| Dispersion Slope (ps/nm²/km) | 0.10 | 0.06 | 0.057 | 0.056 |
| Macrobending Attenuation Coefficient (dB/km) | <10⁻³ | 1 | 4 | 10 |
| Microbending sensitivity (dB/km)/(g/mm) | 1 | 2 | 3 | 4 |
| MFD (μm) | 7.9 | 9.4 | 9.7 | 9.9 |
| Effective Area (μm²) | 46 | 64 | 69 | 72 |
| Non-linearity Coefficient ($W^{-1}m^{-1}$) | 2.6 | 1.3 | 1.2 | 1.1 |
| Cabled Cut-off Wavelength (nm) | | ≦1250 | | |
| Zero Dispersion Wavelength (nm) | | 1385 | | |

Peak-And-Ring Profile

Figure 10A:
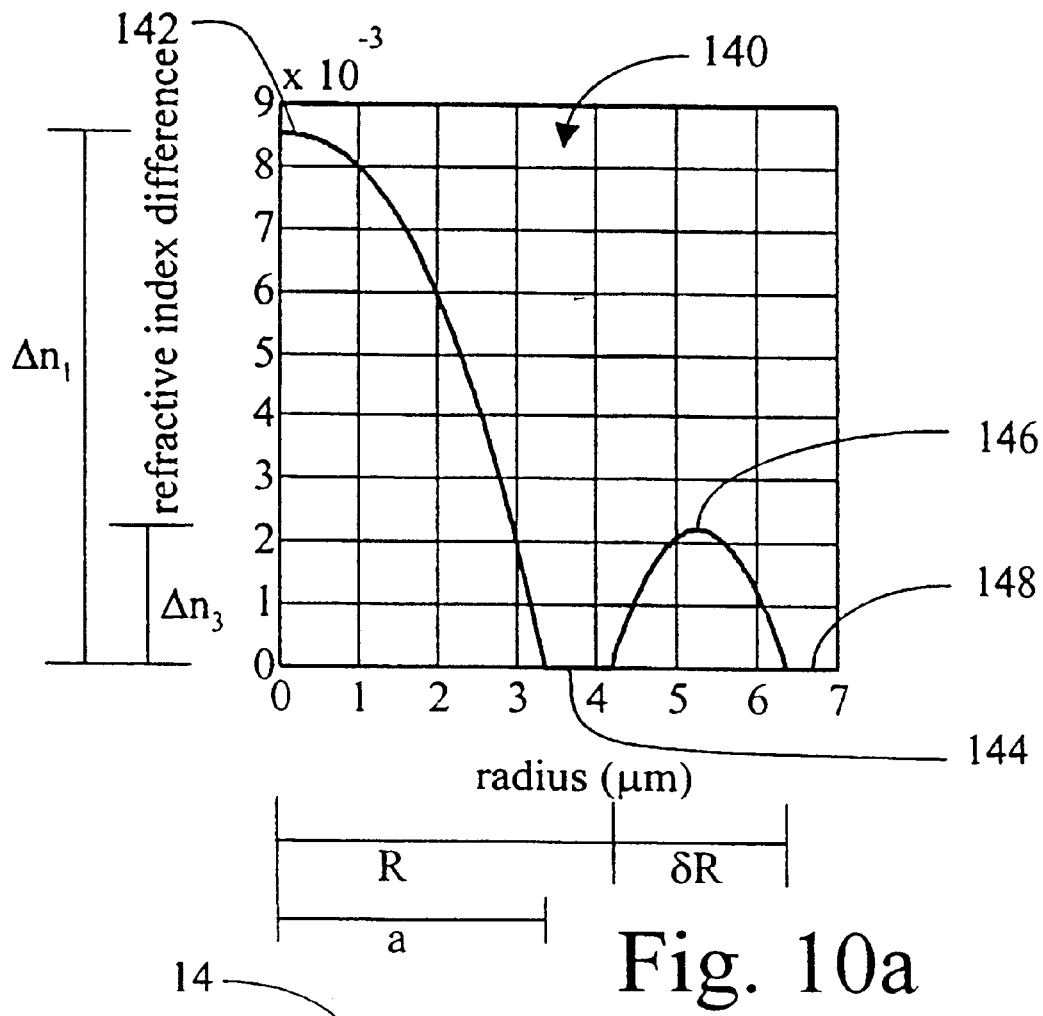
FIG. 10a is a graph illustrating a peak-and-ring refractive index profile of a fiber having transmission characteristics in accordance with the present invention.

As shown in FIG. 10a, the refractive index profile 140 of fiber 14 may be a peak-and-ring profile. The peak-and-ring profile is characterized by a first peak 142 and a second ring peak 146. First peak 142, which has a first refractive index difference $\Delta n_1$ is separated from second peak 146, which has a second refractive index difference $\Delta n_3$, by an area having a constant refractive index 144. The refractive index difference of first peak 142 is greater than the refractive index difference of second peak 146. As shown in the simulation described below, the fiber having the peak-and-ring profile supports a data transmission rate of 10 Gbit/s without dispersion compensation.

Figure 10B:
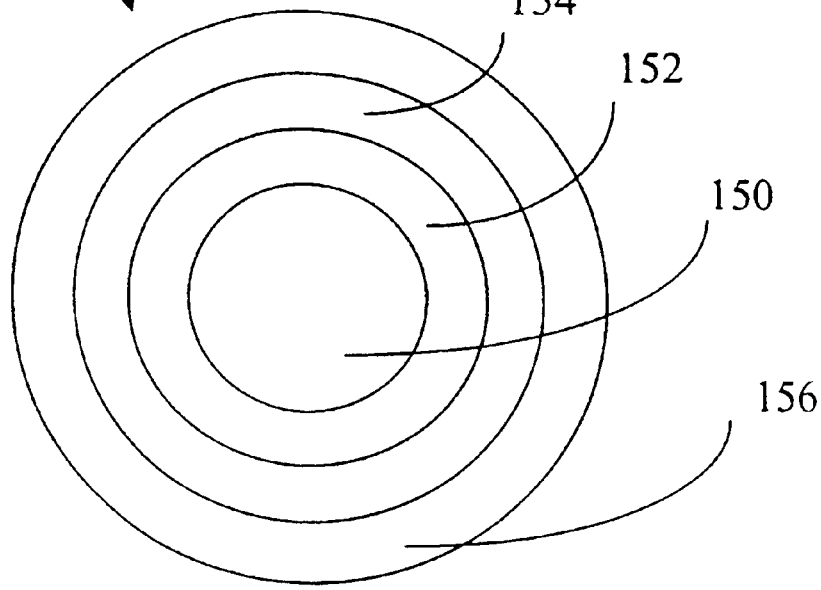

As shown in FIG. 10b, fiber 14 includes an inner core 150, a first glass layer 152, a second glass layer 154, and a cladding 156. Inner core 150 has a radius "a" (referring to FIG. 10a) that preferably is between about 2.0 μm and 4.5 μm. More preferably, a is about 3.4 μm. Between the center of the fiber and the radial position at 3.4 μm, inner core 150 includes a refractive index-increasing dopant such as $GeO_2$ or the like that produces a peak index of refraction at or near the axial center of fiber 14 and a minimum for the inner core at its outer radius. At the peak, the index of refraction $\Delta n_1$ for inner core 150 is preferably between about 0.0070 and 0.0090. More preferably, $\Delta n_1$ is about 0.0085. The concentration of the refractive index-increasing dopant decreases from the center of inner core 150 to the outer radius at about 3.4 μm in a manner to produce a profile having a curved slope that resembles a substantially parabolic shape. Preferably, according to a graded index α profile, the curved slope has an α between about 2 and 3. More preferably, α is about 2.3.

The first glass layer 152 surrounds the inner core 150 and is characterized by an index of refraction across its width that is less than the indices of refraction along the radius of inner core 150. Preferably, first layer 152 is made of glass with Δn=0. First glass layer 152 has an outer radius R that is preferably between about 3.0 μm and 5.0 μm. More preferably, R is about 4.2 μm.

The second glass layer 154 surrounds the first glass layer 152 along the length of the fiber 14. Second glass layer 154 has a radius δR that is preferably between about 2.0 μm and 4.0 μm. More preferably, δR is about 2.2 μm so that the outer radius of second glass layer 154 is about 6.4 μm. As shown in FIG. 10a, second glass layer 154 has an index of refraction $\Delta n_3$ within its width that is less than the maximum index of refraction of the glass $\Delta n_1$ within inner core 150. Second glass layer 154, like inner core 150, has its refractive index difference increased by doping the width of the glass layer with $GeO_2$ or other well-known refractive index-increasing dopants. Preferably, second glass layer 154 has an α profile, where α is between 1 and 4 and the maximum refractive index difference $\Delta n_3$ is between about 0.0010 and 0.0030. More preferably, second glass layer 74 has as α=2 and a maximum refractive index difference $\Delta n_3$ of about 0.0022.

Finally, a light conducting cladding 156 surrounds the second glass layer 154 in a conventional manner to help guide light propagating along the axis of fiber 14. The refractive index difference Δn of cladding 156 is preferably equal to 0 (referred to as 148 in FIG. 10a).

Table 13 summarizes the parameters of a fiber having an index profile illustrated in FIGS. 10a and 10b.

TABLE 13

| a (μm) | $\Delta n_1$ | α | R (μm) | δR (μm) | $\Delta n_3$ |
|---|---|---|---|---|---|
| 3.4 | 0.0085 | 2.3 | 4.2 | 2.2 | 0.0022 |

A computer simulation, as previously described, was performed to determine the transmission characteristics of this embodiment of the fiber. As shown in Table 14 below, the fiber 14 of FIGS. 10a and 10b exhibited desirable dispersion characteristics in both the first and the second wavelength bands. In particular, the cabled fiber had a simulated cut-off wavelength less than about 1250 nm, ensuring single-mode operation at both transmission windows. As well, the refractive index profile produced dispersion at around 1310 nm of −11.3 ps/nm/km and at around 1550 nm of +8.0 ps/nm/km. The zero dispersion wavelength, $\lambda_0$, was about 1440 nm. Based on the simulation results, Applicants have determined that the fiber 14 of FIGS. 10a and 10b supported a maximum bit rate of 10 Gbit/s across the first wavelength band and up to a wavelength of greater than 1600 nm across the second wavelength band, when considering a 50 km length of fiber without dispersion compensation and with external modulation. Table 14 summarizes these results.

TABLE 14

| Operating Wavelength | 1310 nm | 1550 nm | 1600 nm | 1625 nm |
|---|---|---|---|---|
| Dispersion (ps/nm/km) | −11.3 | +8.0 | +11.6 | +13.2 |
| Dispersion Slope (ps/nm²/km) | 0.09 | 0.07 | 0.07 | 0.07 |
| Macrobending Attenuation Coefficient (dB/km) | <10⁻³ | 0.1 | 1 | 2 |
| Microbending sensitivity (dB/km)/(g/mm) | 1 | 2 | 3 | 4 |
| MFD (µm) | 7.6 | 9.3 | 9.7 | 9.9 |
| Effective Area (µm²) | 42 | 63 | 69 | 72 |
| Non-linearity Coefficient (W⁻¹m⁻¹) | 2.9 | 1.4 | 1.2 | 1.1 |
| Cabled Cut-off Wavelength (nm) | ≦1250 | | | |
| Zero Dispersion Wavelength (nm) | 1445 | | | |

Peak-And-Ring Profile with Depressed Trench

Figure 11A:
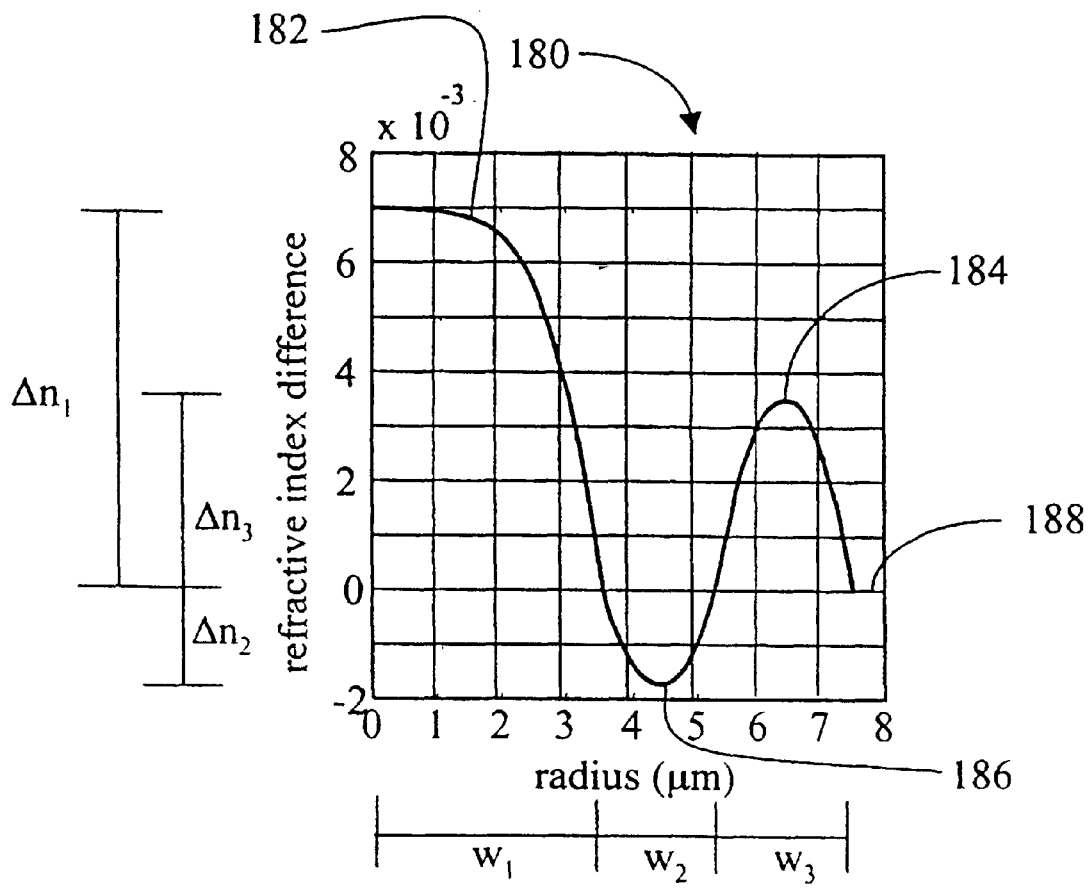
FIG. 11a is a graph illustrating a peak-and-ring refractive index profile with depressed trench of a fiber having transmission characteristics in accordance with the present invention.

As shown in FIG. 11a, the refractive index profile 180 for fiber 14 may have a peak-and-ring profile with depressed trench. This profile is characterized by an area of negative refractive $\Delta n_2$ index 186, having an α profile shape, surrounding a first peak 182 and surrounded by a second peak 184. First peak 182 has a first refractive index $\Delta n_1$ which is greater than the maximum refractive index $\Delta n_3$ of second peak 184. As shown in the simulation described below, the fiber having the peak-and-ring profile with depressed trench supports a data transmission rate of up to 10 Gbits/sec.

Figure 11B:
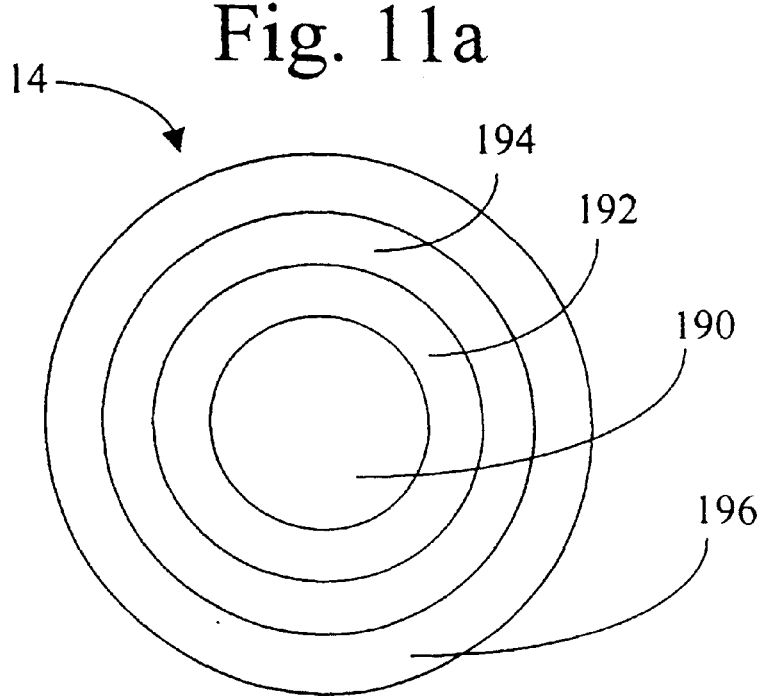

As illustrated in FIG. 11b, the fiber 14 has an inner core 190, a first glass layer 192, a second glass layer 194 and a cladding 196. Inner core 190 has a radius $w_1$, that is preferably between about 2.5 µm and 5.5 µm and more preferably between about 3.4 µm and 4.0 µm. Even more preferably, radius $w_1$ is about 3.5 µm. Between the center of the fiber and the radial position at 3.5 µm, inner core 190 includes a refractive index-increasing dopant such as $GeO_2$ or the like that produces a peak index of refraction at or near the axial center of fiber 14 and a minimum for the inner core at its outer radius. At the peak, the index of refraction $\Delta n_1$ for inner core 190 is preferably between about 0.0060 and 0.0090 and more preferably between about 0.0065 and 0.0075. Even more preferably, $\Delta n_1$ is about 0.0070. The concentration of the refractive index-increasing dopant decreases from the center of inner core 190 to the outer radius in a manner to produce a profile having a curved slope that substantially corresponds to an ox profile. Preferably $\alpha_1$ is between 1 and 10, more preferably between 4 and 6. Even more preferably, $\alpha_1$=5.

The first glass layer 192 surrounds inner core 190 along the width of fiber 14 and is characterized by a rounded-depressed refractive index difference $\Delta n_2$ that is less than the refractive index difference $\Delta n_1$ of the inner core 190. The first glass layer has its refractive index decreased by doping the width of the glass layer with a refractive index-decreasing dopant, such as fluorine. Preferably, the minimum refractive index difference $\Delta n_2$ of first glass layer is between about −0.0050 and −0.0002, more preferably between about −0.0030 and −0.0015. Even more preferably, $\Delta n_2$ is about −0.0017. Preferably, first glass layer 192 has a profile α across its radius, with $\alpha_2$ between 1 and 10, more preferably between 1 and 3. Even more preferably, $\alpha_2$=2. Preferably, first glass layer 192 has a width $w_2$ of between about 0.5 µm and 5.5 µm, more preferably between about 1.5 µm and 2.5 µm. Even more preferably, width $w_2$ is about 1.8 µm and thus first glass layer 192 extends to about 5.3 µm.

The second glass layer 194 surrounds the first glass layer 192 along the length of the fiber 14. Second glass layer 194 has a width $w_3$ that preferably is between about 0.5 µm and 5.5 µm, more preferably is between about 1.5 µm and 3.5 µm. Even more preferably, width $w_3$ is about 2.2 µm, so that the outer radius of second glass layer 194 is about 7.5 µm. As shown in FIG. 11a, second glass layer 194 has a maximum index of refraction $\Delta n_3$ within its width that is less than the maximum index of refraction of the glass An, within inner core 190. Second glass layer 194, like inner core 190, has its refractive index difference increased by doping the width of the glass layer with $GeO_2$ or other well-known refractive index-increasing dopants. Preferably, second glass layer 194 has a profile α across its radius, with $\alpha_3$ between 1 and 10 and more preferably between 1 and 3, that culminates in a maximum refractive index difference $\Delta n_3$, which is preferably between about 0.0010 and 0.0080, more preferably between about 0.0020 and 0.0060. Even more preferably, $\Delta_3$=2 and the maximum refractive index difference $\Delta n_3$ is about 0.0035.

Finally, a light conducting cladding 196 surrounds the second glass layer in a conventional manner to help guide light propagating along the axis of fiber 14. The refractive index difference $\Delta n$ of cladding 196 is preferably equal to 0 (referred to as 188 in FIG. 11a).

Table 15 summarizes the parameters of a fiber having an index profile illustrated in FIGS. 11a and 11b.

TABLE 15

| $\alpha_1$ | $w_1$ (µm) | $\Delta n_1$ | $\alpha_2$ | $w_2$ (µm) | $\Delta n_2$ | $\alpha_3$ | $w_3$ (µm) | $\Delta n_3$ |
|---|---|---|---|---|---|---|---|---|
| 5 | 3.5 | 0.0070 | 2 | 1.8 | −0.0017 | 2 | 2.2 | 0.0035 |

A computer simulation, as previously described, was performed to determine the transmission characteristics of this embodiment of the fiber. As shown in Table 16 below, the fiber 14 of FIGS. 11a and 11b exhibited desirable dispersion characteristics in both the first and the second wavelength bands. In particular, the cabled fiber had a simulated cut-off wavelength less than about 1250 nm, ensuring single-mode operation at both transmission windows. As well, the refractive index profile produced dispersion at around 1310 nm of −10.0 ps/nm/km and at around 1550 nm of +7.2 ps/nm/km. The zero dispersion wavelength, $\lambda_0$, was about 1445 nm. Based on the simulation results, Applicants have determined that the fiber 14 of FIGS. 11a and 11b supported a maximum bit rate of 10 Gbit/s across the first wavelength band and up to a wavelength of greater than 1600 nm across the second wavelength band, when considering a 50 km length of fiber without dispersion compensation and with external modulation. Table 16 summarizes these results.

TABLE 16

| Operating Wavelength | 1310 nm | 1550 nm | 1600 nm | 1625 nm |
|---|---|---|---|---|
| Dispersion (ps/nm/km) | −10.0 | 7.2 | 10.6 | 12.3 |
| Dispersion Slope (ps/nm²/km) | 0.08 | 0.07 | 0.07 | 0.07 |
| Macrobending Attenuation Coefficient (dB/km) | <10⁻³ | 0.1 | 1 | 2 |
| Microbending sensitivity (dB/km)/(g/mm) | 1 | 3 | 4 | 5 |
| MFD ($\mu$m) | 7.7 | 9.4 | 9.8 | 10.0 |
| Effective Area ($\mu$m²) | 45 | 67 | 73 | 76 |
| Non-linearity Coefficient (W⁻¹m⁻¹) | 2.7 | 1.3 | 1.1 | 1.0 |
| Cabled Cut-off Wavelength (nm) | ≦1250 | | | |
| Zero Dispersion Wavelength (nm) | 1445 | | | |

The present invention as disclosed herein provides a single-mode optical fiber with improved versatility for use in both a first wavelength band between about 1300 nm and 1350 nm and a second wavelength band between about 1450 nm and 1625 nm. The fiber has a moderate dispersion value at both transmission windows, preferably with a slightly negative value within the first wavelength band and a slightly positive value within the second wavelength band. The preferred monotonic dispersion characteristic of dispersion across the bandwidth of the fiber results in a zero-dispersion wavelength of around 1400 nm and a relatively small slope for dispersion at 1550 nm. Accordingly, the optical fiber of the present invention accommodates both existing 1310 nm systems as well as developing 1550 nm and 1625 nm systems with a moderate dispersion.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A high speed metropolitan or access optical communication system, comprising:
   an optical signal transmitter operating in a wavelength band surrounding at least one of a first operating wavelength at 1310 nm and a second operating wavelength at 1550 nm;
   an optical transmission line coupled at one end to the optical signal transmitter;
   a receiver coupled to an opposite end of the optical transmission line;
   wherein the transmission line comprises at least one cabled single-mode optical fiber having a maximum refractive index difference located in a glass layer of the fiber and wherein the cabled fiber has a cutoff wavelength less than 1300 nm, a positive dispersion with an absolute value of between about 5 ps/nm/km and about 15 ps/nm/km at one of the first and second operating wavelengths, a negative dispersion with an absolute value of between about 5 ps/nm/km and about 15 ps/nm/km at the other of the first and second operating wavelengths, a zero dispersion at a wavelength between the first and second operating wavelengths, and an effective area at a wavelength around 1550 nm greater than about 60 $\mu$m².

2. The system according to claim 1, wherein the optical transmission line has a length equal to or less than about 150 km.

3. The system according to claim 2, wherein the optical transmission line has a length equal to or less than about 80 km.

4. The system according to claim 1, wherein the dispersion at the first operating wavelength is negative and the dispersion at the second operating wavelength is positive, and the dispersion increases monotonically from the first operating wavelength to the second operating wavelength.

5. The system according to claim 1, wherein the wavelength band surrounding the first operating wavelength ranges from about 1300 nm to 1350 nm and the wavelength band surrounding the second operating wavelength ranges from about 1450 nm to 1625 nm.

6. The system according to claim 1, wherein the fiber has an effective area of greater than about 65 $\mu$m² at a wavelength of about 1550 nm.

7. The system according to claim 1, wherein the fiber has a non-linearity coefficient of less than 1.5 W⁻¹m⁻¹ in the second wavelength band.

8. The system according to claim 1, wherein the fiber has a dispersion slope of less than about 0.08 ps/nm²/km in the second wavelength band.

9. The system according to claim 1, wherein the fiber has a microbending sensitivity of less than about 10 (dB/km)/(g/mm) in the second wavelength band.

10. The system according to claim 1, wherein the cabled fiber has a transmission cut-off wavelength that is less than about 1250 nm.

11. The system according to claim 1, further comprising at least one optical amplifier coupled along the optical transmission line.

12. A single-mode optical transmission fiber with a core and a cladding, for use in a metropolitan or access network, the core comprising:
   an inner core having a first refractive index difference; and
   a first glass layer surrounding the inner core and having a maximum second refractive index difference greater than the first refractive index difference and lower than about 0.0140, wherein the cabled fiber has a cutoff wavelength less than about 1300 nm, an absolute value of dispersion between about 5 ps/nm/km and 15 ps/nm/km at both a first wavelength of about 1310 nm and a second wavelength of about 1550 nm, a zero value of dispersion at a wavelength between about 1350 nm and 1450 nm and an effective area at a wavelength around 1550 nm greater than about 60 $\mu$m².

13. The fiber according to claim 12, wherein the inner core has a refractive index difference of substantially zero.

14. The fiber according to claim 13, wherein the first glass layer has a maximum refractive index difference of between about 0.0090 and 0.0140.

15. The fiber according to claim 12, further comprising a second glass layer radially comprised between the inner core and the first glass layer, the second glass layer having a refractive index difference of substantially zero.

16. The fiber according to claim 15, wherein the inner core has a maximum refractive index difference of between about 0.0020 and 0.0060.

17. The fiber according to claim 16, wherein the first glass layer has a maximum refractive index difference of between about 0.0090 and 0.0140.

18. The fiber according to claim 12, further comprising a second glass layer surrounding the inner core and having a depressed refractive index.

19. The fiber according to claim 18, wherein the inner core has a maximum refractive index difference of between about 0.0060 and 0.0120.

20. The fiber according to claim 19, wherein the second glass layer has a width $w_2$ of between about 0.5 μm and 5.5.

21. The fiber according to claim 20, wherein the first glass layer has a maximum refractive index difference of between about 0.0060 and 0.0120.

22. A single-mode optical transmission fiber with a core and a cladding, for use in a metropolitan or access network, the core comprising:

an inner core having a first refractive index difference; and a first glass layer surrounding the inner core, the refractive index difference of the inner core being greater than the refractive index difference of the first glass layer and the refractive index difference of the first glass layer being greater than zero, wherein the inner core has a maximum refractive index difference of between about 0.0060 and 0.0090, and wherein the cabled fiber has a cutoff wavelength less than about 1300 nm, an absolute value of dispersion between about 5 ps/nm/km and 15 ps/nm/km at both a first wavelength of about 1310 nm and a second wavelength of about 1550 nm, a zero value of dispersion at a wavelength between about 1350 nm and 1450 nm and an effective area at a wavelength around 1550 nm greater than about 60 $\mu m^2$.

23. The fiber of claim 22, wherein the inner core extends to an outer radius of between about 2.0 and 4.0 μm.

24. The fiber of claim 22, wherein a second glass layer is disposed between the inner core and the first glass layer, the second glass layer having a refractive index difference of substantially zero.

25. The fiber of claim 24 wherein the inner core extends to an outer radius of between about 2.0 and 4.5 μm.

26. The fiber of claim 22, wherein a second glass layer is disposed between the inner core and the first glass layer, the second glass layer having a depressed refractive index difference.

27. The fiber of claim 26 wherein the inner core extends to an outer radius of between about 2.5 and 5.5 μm.

28. A wavelength division multiplexing optical transmission method, comprising the following steps:

transmitting optical signals over a range of transmission channels within a first wavelength band between about 1300 nm and 1350 nm and a second wavelength band between 1450 nm and 1625 nm;

coupling the optical signals to at least one single-mode optical fiber having an inner core and at least a first glass layer, wherein the cabled fiber has a cutoff wavelength less than 1300 nm, a positive dispersion with an absolute value of less than about 15 ps/nm/km at a wavelength of about 1550 nm, a negative dispersion with an absolute value less than about 15 ps/nm/km at a wavelength of about 1310 nm, a zero dispersion at a wavelength between about 1350 nm and 1450 nm and an effective area at a wavelength around 1550 nm greater than about 60 $\mu m^2$; and receiving the signals from the single-mode optical fiber.

29. The system according to claim 1, wherein the fiber includes a dispersion between about 5 ps/nm/km and about 12 ps/nm/km at the second operating wavelength.

30. The system according to claim 1, wherein the fiber includes a macrobending coefficient of less than about 25 dB/km across the wavelength band surrounding the first operating wavelength and the wavelength band surrounding the second operating wavelength.

31. The system according to claim 1, wherein the fiber includes a macrobending coefficient of less than about 1 dB/km in the wavelength band surrounding the second operating wavelength.

32. The fiber according to claim 12, wherein the inner core has a radius R of between about 0.5 μm and 2.5 μm.

33. The fiber according to claim 13, wherein the first glass layer has a profile α of between 1 and 3.

34. The fiber according to claim 13, wherein the first glass layer has a width δR of between about 0.5 μm and 2.0 μm.

35. The fiber according to claim 12, further comprising a second glass layer radially comprised between the inner core and the first glass layer, the second glass layer having an outer radius R of between about 1.0 μm and 2.0 μm.

36. The fiber according to claim 15, wherein the inner core has a profile α of between 1 and 4.

37. The fiber according to claim 15, wherein the inner core has a radius a of between about 0.5 μm and 2.0 μm.

38. The fiber according to claim 16, wherein the first glass layer has a width δR of between about 1.0 μm and 2.0 μm.

39. The fiber according to claim 18, wherein the inner core has a profile α of between 1 and 10.

40. The fiber according to claim 18, wherein the inner core has a radius $w_1$ of between about 2.5 μm and 5.5 μm.

41. The fiber according to claim 19, wherein the second glass layer has a minimum refractive index difference of between about -0.0050 and -0.0002.

42. The fiber according to claim 20, wherein the first glass layer has a width $w_3$ of between about 0.4 μm and 3.0 μm.

43. The fiber of claim 22, wherein the first glass layer extends from an outer radius of the inner core to an outer radius of between about 3.0 and 5.0 μm.

44. The fiber of claim 22, wherein the first glass layer has a maximum refractive index difference of between about 0.0020 and 0.0050.

45. The fiber of claim 24, wherein the inner core has a maximum refractive index of between about 0.0070 and 0.0090.

46. The fiber of claim 24, wherein the second glass layer extends from an outer radius of the inner core to an outer radius of between about 3.0 and 5.0 μm.

47. The fiber of claim 24, wherein the first glass layer radially extends from an outer radius of the second glass layer for about 2.0 to 4.0 μm.

48. The fiber of claim 24, wherein the first glass layer has a maximum refractive index difference of between about 0.0010 and 0.0030.

49. The fiber of claim 26, wherein the second glass layer extends from an outer radius of the inner core for a width of between about 0.5 and 5.5 μm.

50. The fiber of claim 26, wherein the second glass layer has a minimum refractive index difference of between about -.00050 and -0.0002.

51. The fiber of claim 26, wherein the first glass layer radially extends from an outer radius of the second glass layer for about 0.5 to 5.5 μm.

52. The fiber of claim 26, wherein the first glass layer has a maximum refractive index difference of between about 0.0010 and 0.0080.

* * * * *

UNITED STATES PATENT AND TRADEMARK OFFICE
CERTIFICATE OF CORRECTION

PATENT NO.   : 6,577,800 B2
DATED        : June 10, 2003
INVENTOR(S)  : Davide Sarchi et al.

It is certified that error appears in the above-identified patent and that said Letters Patent is hereby corrected as shown below:

<u>Column 29,</u>
Line 8, "5.5." should read -- 5.5 $\mu$m. --.

<u>Column 30,</u>
Line 59, "-.00050" should read -- -0.0050 --.

Signed and Sealed this

Third Day of February, 2004

JON W. DUDAS
*Acting Director of the United States Patent and Trademark Office*